United States Patent [19]
Du et al.

[11] Patent Number: 6,108,152
[45] Date of Patent: Aug. 22, 2000

[54] REDUNDANT SYNCHRONIZATION FIELDS TO IMPROVE DISC DRIVE READ PERFORMANCE

[75] Inventors: Ke Du, Oklahoma City; Robert D. Cronch, Edmond, both of Okla.; Kenneth R. Burns, Bloomington; Bernardo Rub, Edina, both of Minn.

[73] Assignee: Seagate Technology, Inc., Scotts Valley, Calif.

[21] Appl. No.: 08/898,871

[22] Filed: Jul. 22, 1997

Related U.S. Application Data

[60] Provisional application No. 60/027,344, Oct. 1, 1996.

[51] Int. Cl.$^7$ .......................................................... G11B 5/09
[52] U.S. Cl. ................................ 360/51; 360/53; 360/48; 360/40
[58] Field of Search .................................. 360/51, 53, 48, 360/40, 25, 46

[56] References Cited

U.S. PATENT DOCUMENTS

| | | |
|---|---|---|
| 5,051,998 | 9/1991 | Murai et al. . |
| 5,057,785 | 10/1991 | Chung et al. . |
| 5,136,439 | 8/1992 | Weispfenning et al. . |
| 5,262,907 | 11/1993 | Duffy et al. . |
| 5,276,662 | 1/1994 | Shaver, Jr. et al. . |
| 5,313,340 | 5/1994 | Takayama et al. . |
| 5,379,160 | 1/1995 | Otani .......................................... 360/61 |
| 5,422,760 | 6/1995 | Abbott et al. . |
| 5,459,757 | 10/1995 | Minuhin et al. . |
| 5,592,340 | 1/1997 | Minuhin et al. . |
| 5,627,843 | 5/1997 | Deng et al. . |
| 5,631,999 | 5/1997 | Dinsmore . |
| 5,844,920 | 12/1998 | Zook et al. ............................ 360/51 X |
| 5,940,233 | 8/1999 | Malone, Sr. .............................. 360/51 |

OTHER PUBLICATIONS

Finch and Moczarny, "Headerless disk formatting: Making room for more data," Data Storage Magazine, Apr. 1997, pp. 51, 52, and 54, vol. 4, No. 5, Pennwell Publishing Co., Tulsa, Oklahoma.

*Primary Examiner*—Alan T. Faber
*Attorney, Agent, or Firm*—Crowe & Dunlevy

[57] ABSTRACT

An apparatus and method are disclosed for reducing the effects of thermal asperities and other anomalous conditions on disc drive read operations. An improved data block format is provided having first and second sync fields in which sync patterns are stored, the first and second sync fields being separated by a selected distance within the data block. The sync pattern of the second sync field enables synchronization of a disc drive read channel to the user data in the data block when the read channel fails to be synchronized by the sync pattern of the first sync field. In one embodiment, control information used by the read channel to prepare for receipt of the user data is stored in a field between the first and second sync fields; in an alternative embodiment, a portion of the user data is stored between the first and second sync fields.

19 Claims, 9 Drawing Sheets

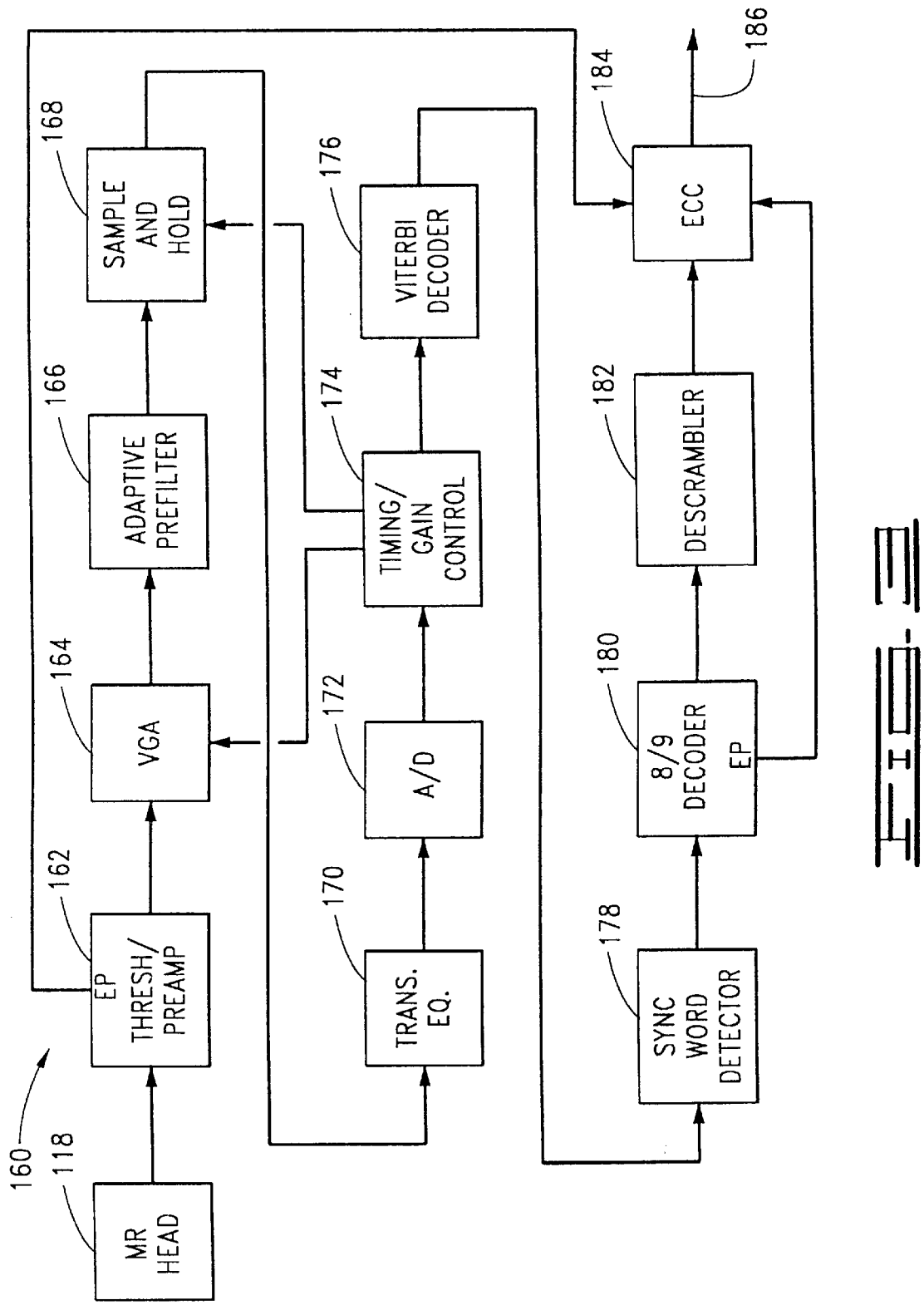

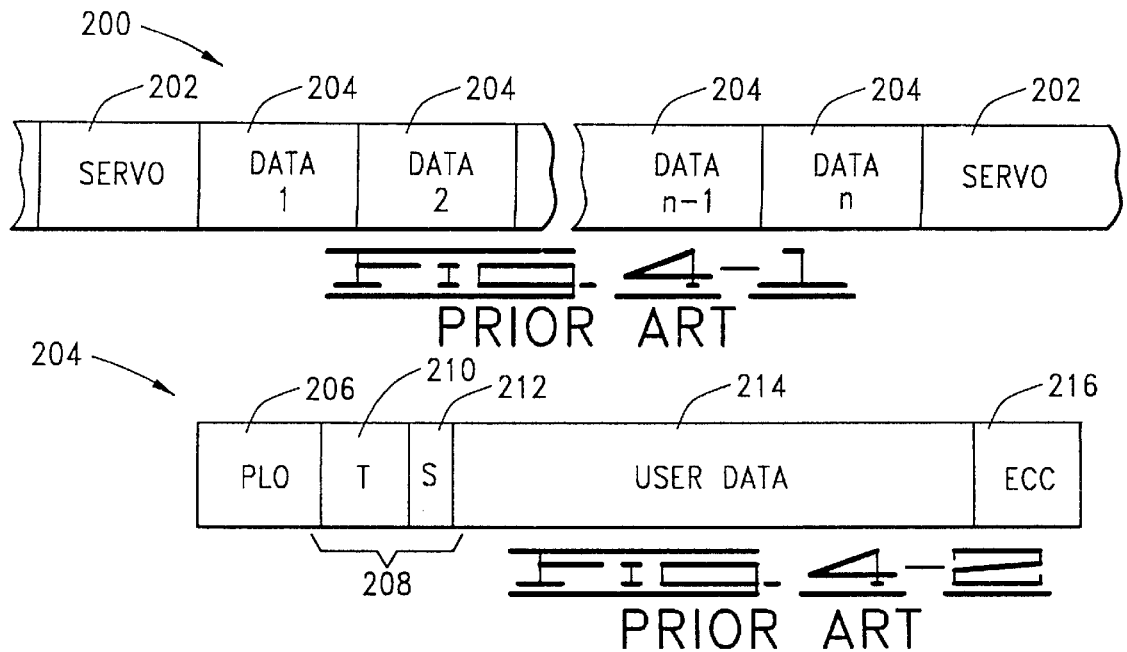
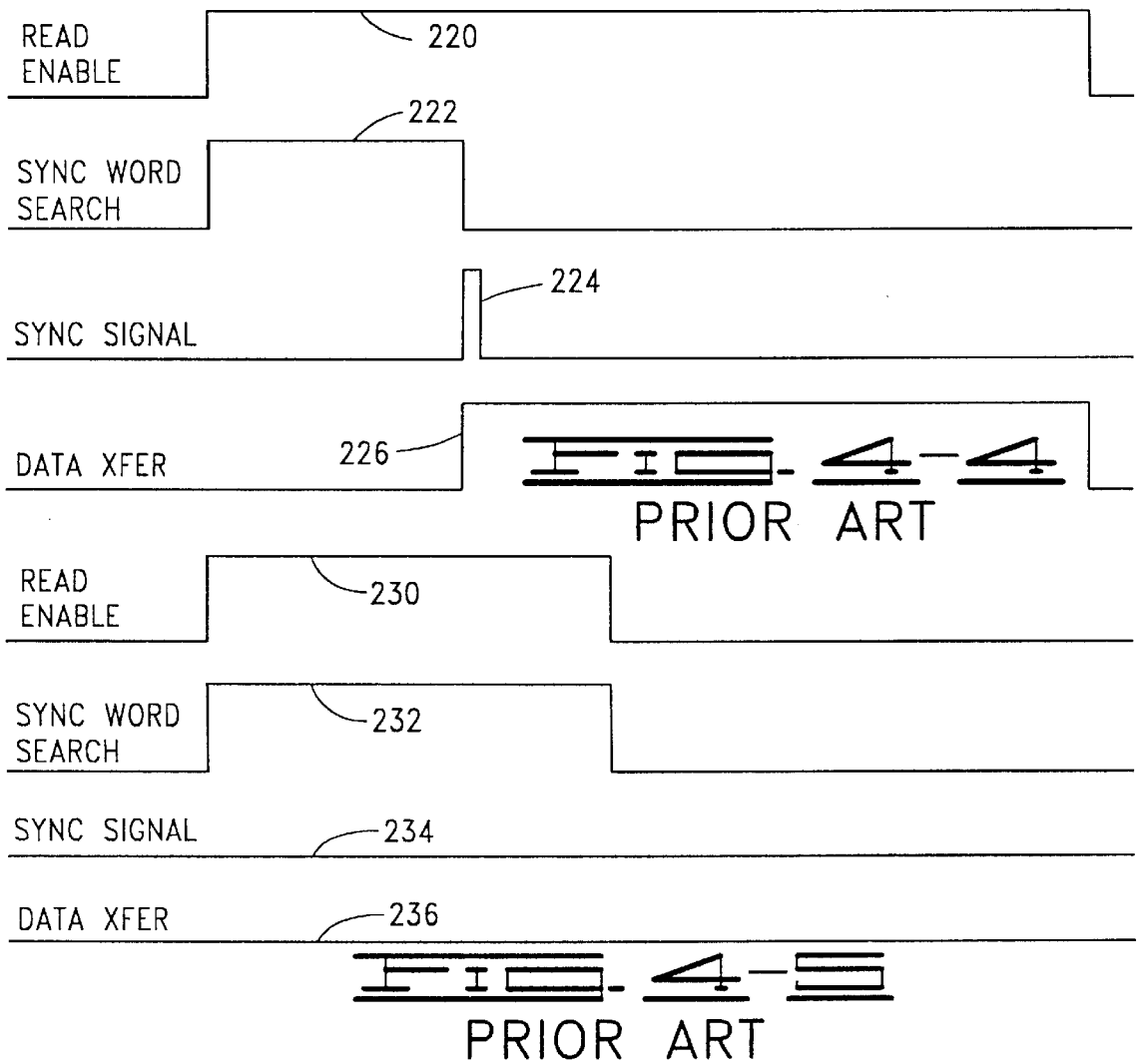

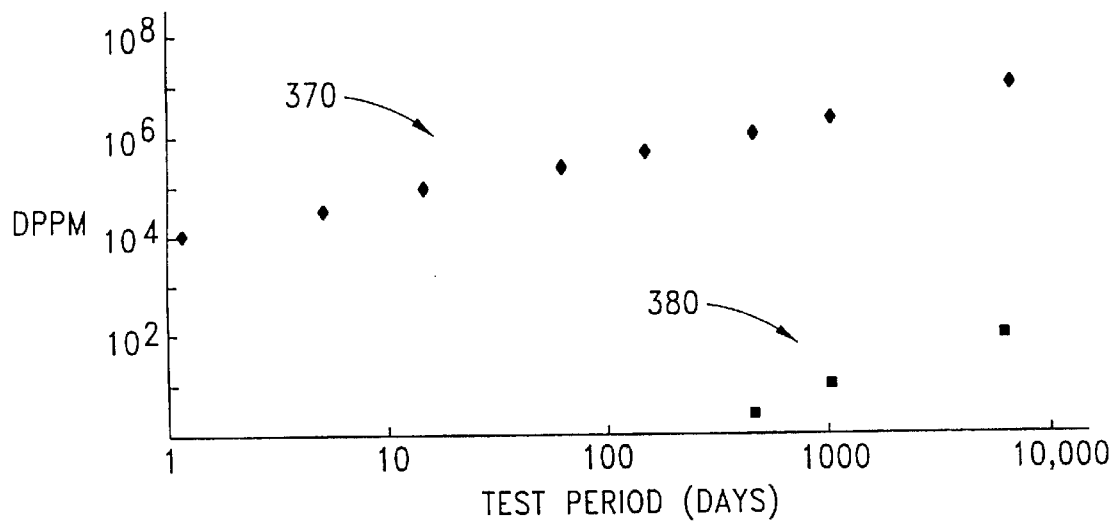
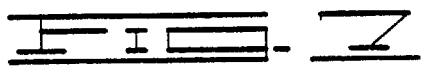
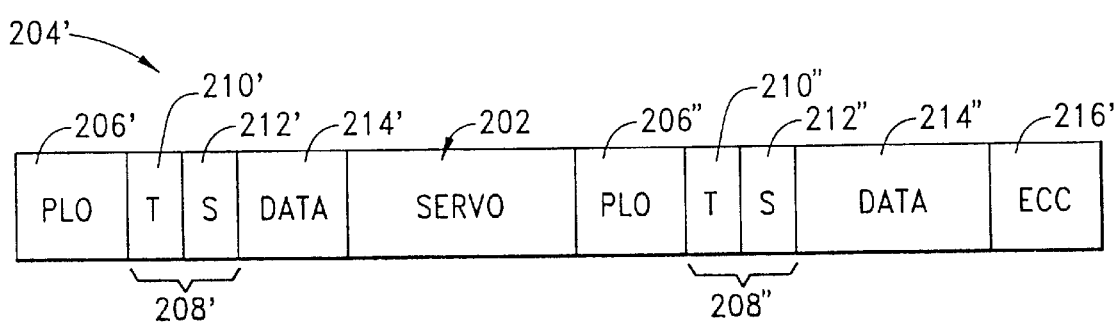
PRIOR ART

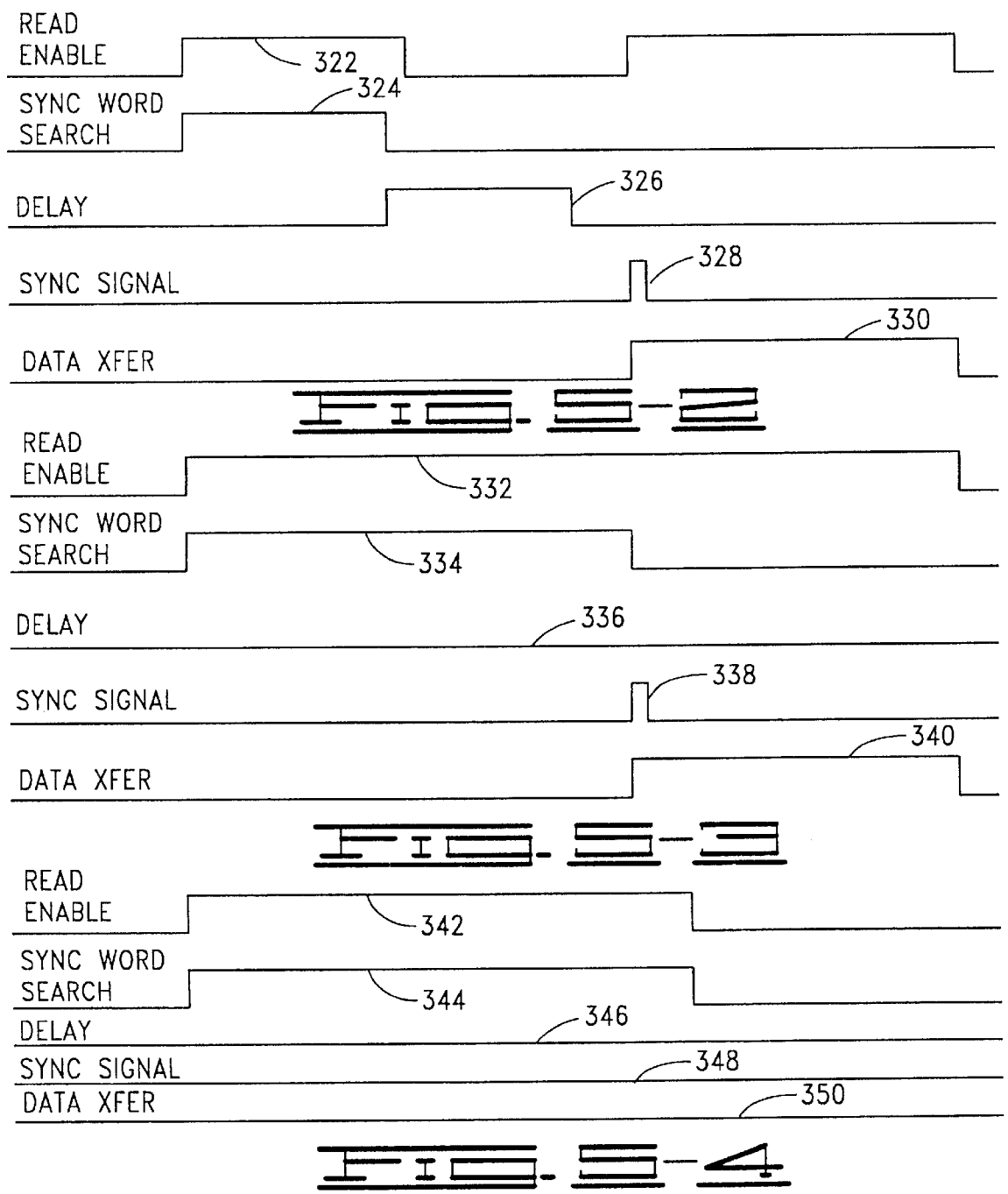

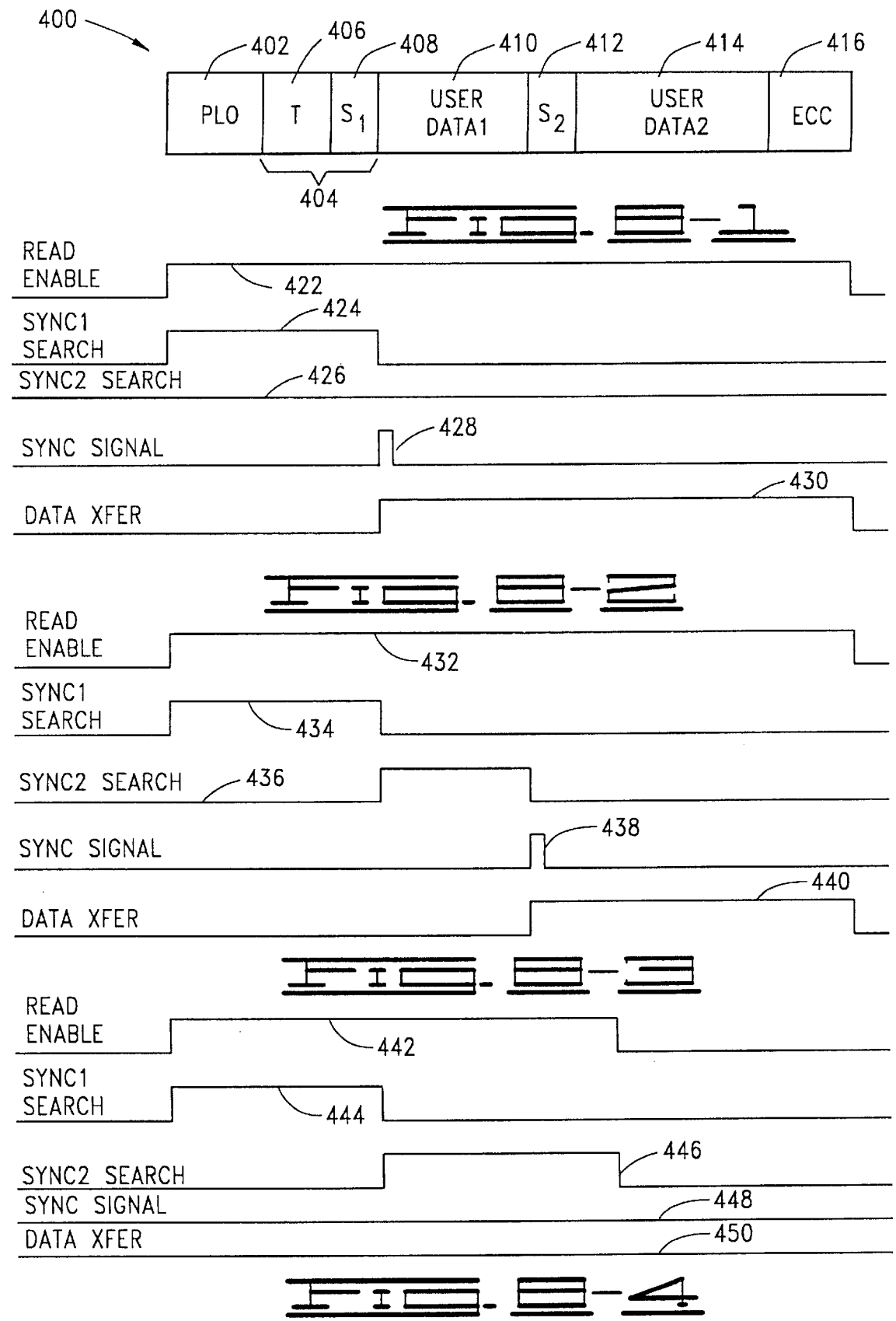

REDUNDANT SYNCHRONIZATION FIELDS TO IMPROVE DISC DRIVE READ PERFORMANCE

RELATED APPLICATIONS

This application claims priority to U.S. Provisional Application No. 60/027,344, filed Oct. 1, 1996.

FIELD OF THE INVENTION

This invention relates generally to the field of disc drive data storage devices, and more particularly, but not by way of limitation, to improving the read performance of a disc drive in the presence of anomalous conditions, such as thermal asperities and media defects, through the use of redundant synchronization fields within contiguous data blocks used to store user data.

BACKGROUND

Data storage devices of the type known as "Winchester" disc drives, or hard disc drives, are typically utilized as primary data storage devices in modern computer systems. Such disc drives record digital data on a plurality of circular, concentric data tracks on the surfaces of one or more rigid discs. The discs are typically mounted for rotation on the hub of a brushless direct current (dc) spindle motor. In disc drives of the current generation, the spindle motor rotates the discs at speeds of up to 10,000 revolutions per minute.

Data are stored on and retrieved from the tracks using an array of vertically aligned read/write head assemblies, or heads, which are controllably moved from track to track by an actuator assembly. The read/write head assemblies typically comprise an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of vertically aligned, radially extending actuator head mounting arms, to which the head suspensions mentioned above are mounted.

Thus, when current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved radially across the data tracks along an arcuate path.

The movement of the heads across the disc surfaces in a disc drive utilizing a voice coil actuator systems is typically under the control of a closed loop servo system. In a closed loop servo system, specific data patterns used to define the location of the heads relative to the disc surface are prerecorded on the discs during the disc drive manufacturing process. These servo data patterns can be recorded exclusively on one surface of one disc and continuously read, or can be recorded at the beginning of each user data recording location and read intermittently between intervals of recording or recovering of user data. Such servo systems are referred to as "dedicated" and "embedded" servo systems, respectively.

It is also common practice in the industry to divide each of the tracks on the disc surface into a number of sectors (also referred to as "data blocks" and "data fields") for the storage of user data. The identity of each sector, and thus the radial and circumferential location of the disc relative to the heads, is determined by prerecorded sector ID information included in the servo data pattern. In typical servo systems, a servo header is recorded at the beginning of each user data sector, which includes, among other information, the track number and sector number, thus providing to the servo system a continually updated status on the location of the actuator relative to the disc.

In some disc drives of the current generation, the data blocks are not only used to store user data, but also can be used to provide tuning information to adapt a read/write channel to the particular combination of recording medium and head for each disc surface. It is common in such disc drives for the data block on the disc surface to include control fields used to automatically adjust the gain of the write and read amplifiers used to control the recording and recovery of user data. Thus, prior to any attempt to access user data, the read/write channel is optimized for each access.

Moreover, data blocks typically include a synchronization (sync) field which enables the disc drive to correctly detect the beginning of the user data stored in the data block. That is, the sync field enables the read/write channel to synchronize with the user data so that the data can be properly retrieved from the data block.

As the physical size of disc drives has decreased historically, the physical size of many of the disc drive components has also decreased to accommodate this size reduction. Similarly, the density of the data recorded on the magnetic media has been greatly increased. In order to accomplish this increase in data density, significant improvements in both the recording heads and media have been achieved.

For example, the first rigid disc drives used in personal computers had a data capacity of only 5 megabytes using discs of 133.4 millimeters in diameter (commonly referred to in the industry as the full height, 5¼ inch format). By contrast, personal computers now typically utilize disc drives with data capacities of up to several gigabytes and discs of 95.0 millimeters in diameter (3.74 inch for 3½ inch format). Portable notebook computers typically use disc drives having about the same recording capacity, but with discs of only 63.5 millimeters in diameter (2½ inch format). Even smaller disc drives having discs of 45.7 millimeters in diameter (1.8 inch format) have been introduced in Type III Personal Computer Memory Card International Association (PCMCIA) cards, which are credit card sized (85.6 by 54 millimeter) cards popular in notebook computers and other portable electronic devices. Clearly, consumer demands will continue to drive ever greater recording densities for disc drive applications in the foreseeable future.

Likewise, the recording heads used in disc drives have evolved from monolithic inductive heads to composite inductive heads (without and with metal-in-gap technology) to thin-film heads fabricated using semi-conductor deposition techniques to the current generation of thin-film heads incorporating inductive write and magneto-resistive (MR) read elements. As will be recognized, MR heads detect the presence of magnetic flux reversals on the discs by reacting to the presence of flux changes with a proportional change in electrical resistance. The MR read element in such heads is biased with a constant low level dc current, and induced resistance changes are readily detected as sensed changes in the amount of voltage across the MR element.

With increases in data storage density and reductions in flying height of the heads, disc drives are becoming increasingly sensitive to the effects of anomalous conditions caused by defects associated with the media. Particularly, localized anomalies in the media on a disc surface may provide insufficient magnetization characteristics to allow data to be reliably stored and retrieved during the operational life of the disc drive.

Moreover, certain very small defects on the surface of the recording discs can still be large enough to physically contact the MR element of the heads as the discs rotate under the heads. Such contact, while of very short time duration, results in frictional heating of the MR element and the change of temperature brought about by the contact also produces a change in resistance in the MR element. Such events are known as thermal asperities, or TAs, and can significantly distort the readback signal generated by the head.

Similarly, small "hills" and "valleys" in the disc surfaces can also induce thermal asperity events even without physical contact between the MR element and the disc surface. Because the bias current applied to the MR element results in heating of the MR element, a thermal equilibrium is established in which the generated heat in the MR element is constantly dissipated from the MR element through other elements of the head assembly and, to a lesser extent, across the air bearing supporting the slider to the disc itself. Thus, disc surface variations that change the spacing between the MR element and the disc can induce attendant changes in the heat dissipation characteristics of the head, resulting in distortion in the readback signal obtained from the head.

TAs found in disc drives using currently available media are of a size which can span a significant number of bytes; for example, in a disc drive having a data transfer rate of 200 megabits per second (Mbits/sec), uncompensated thermal asperities can typically last from 2 to 5 microseconds, distorting from about 50 to 125 bytes of data. Further, it will be recognized that TAs can grow over time due to factors such as contamination and corrosion of the disc surfaces, which can significantly degrade the capabilities of a disc drive to reliably store and retrieve user data over the operational life of the drive.

Anomalous conditions that cause a distortion of the readback signal corresponding to user data can often be compensated for by the error detection and correction circuitry of the read/write channel; however, anomalous conditions that coincide with control fields used to tune the channel can affect the ability of the channel to be properly set up for receipt of the associated user data. More significantly, an anomalous condition coincident with the sync field can prevent synchronization of the channel with the user data, preventing the disc drive from retrieving the user data stored in a data block altogether.

Defect screening operations are typically performed on disc drives during manufacturing to minimize the effects of anomalous conditions upon disc drive performance. However, the fact that many anomalous conditions associated with disc drives are not initially present in the drives, but rather arise during the operational lives of the drives, undesirably results in the degradation of disc drive performance once the disc drives are placed in user environments. This situation will generally continue as ever greater disc drive data storage and transfer capabilities are achieved.

Accordingly, there is a continual need to minimize the effects of anomalous conditions, such as media defects and thermal asperities, that arise during the operational life of a disc drive that tend to degrade the read performance of the disc drive.

SUMMARY OF THE INVENTION

The present invention provides an apparatus and method for preventing a loss of data synchronization in a disc drive brought about by the presence of an anomalous condition coincident with a synchronization (sync) field of a disc drive data block. This is generally accomplished through the use of redundant sync fields in the data block so that the occurrence of the anomalous condition will not prevent recovery of the user data stored in the data block. The anomalous condition may be a media defect, a thermal asperity, or the like.

More particularly, in accordance with a first preferred embodiment of the present invention, a data block format is provided having a primary set of control fields comprising a primary phase locked oscillator (PLO) field, a primary training field and a primary sync field, followed by a second set of control fields comprising a secondary PLO field, a secondary training field and a secondary sync field. User data and error correction code (ECC) fields follow the secondary sync field and complete the data block.

When data synchronization and read channel tuning are successfully achieved during the reading of the primary control fields, the generation of system sync signal for the data channel is delayed to the end of the secondary control field time interval, thus ignoring the effects of any anomalous condition encountered during the secondary control field time interval. However, when an anomalous condition is encountered during the primary control field time interval, read channel synchronization and tuning are achieved from the information provided during the secondary control field time interval.

Further, in accordance with a second preferred embodiment of the invention, a data block format is provided having a first set of control fields comprising a PLO field, a training field and a first sync field. A selected amount of user data is then stored in a first user data field following the first sync field. The remaining control field is then provided as a second sync field immediately after the first user data field, after which the remaining portions of the user data are stored in a second user data field following the second sync field. An ECC code field is then provided after the second user data field to complete the data block.

During a normal read operation, read channel adaptation and timing is established from the PLO, timing and first sync fields. The read channel proceeds to recover the user data from the first and second user data fields and discards the recovered sync pattern from the second sync field. However, should an anomalous condition prevent channel synchronization from the first sync field, channel synchronization is achieved from the second sync field. The read channel thus proceeds to recover the user data from the second user data field and then reconstructs the user data from the first user data field using conventional ECC techniques.

These and various other features as well as advantages which characterize the present invention will be apparent from a reading of the following detailed description and a review of the associated drawings.

BRIEF DESCRIPTION OF THE DRAWINGS

FIG. 3 is a functional block diagram of the read channel portion of the read/write channel of FIG. 2.

FIG. 4-1 is a representation of a portion of a prior art data track, including a conventional arrangement of servo blocks and data blocks.

FIG. 4-2 is a representation of the format of one of the prior art data blocks of FIG. 4-1.

FIG. 4-3 is a representation of the format of a non-contiguous prior art data block coinciding in location with a servo block, the data block of FIG. 4-3 being split into two portions, one immediately before and the other immediately after the servo block.

FIG. 4-4 is a timing diagram representative of timing windows established during a read operation upon the prior art data block format of FIG. 4-2.

FIG. 4-5 is a timing diagram representative of timing windows established during a read operation upon the prior art data block format of FIG. 4-2, in which the occurrence of a thermal asperity or other anomalous condition prevents synchronization with the data in the data block.

FIG. 5-1 is a representation of a disc drive data block formatted in accordance with a first preferred embodiment of the present invention.

FIG. 5-2 is a timing diagram representative of timing windows established during a read operation of the disc drive of FIG. 1 through the use of the data block format of FIG. 5-1.

FIG. 5-3 is a timing diagram representation of timing windows established during a read operation of the disc drive of FIG. 1 through the use of the data block format of FIG. 5-1, wherein a thermal asperity or other anomalous condition prevents the detection of the primary sync word from the primary sync field of the data block.

FIG. 5-4 is a timing diagram representative of timing windows established during a read operation of the disc drive of FIG. 1 through the use of the data block format of FIG. 5-1, wherein a thermal asperity or other anomalous condition prevents the detection of both the primary and secondary sync words from the primary and secondary sync fields, respectively.

FIG. 7 is a graph showing a statistical comparison of unrecoverable data errors experienced using the prior art data block format of FIG. 4-2 and the data block format of FIG. 5-1.

FIG. 8-1 is a representation of a disc drive data block formatted in accordance with a second preferred embodiment of the present invention.

FIG. 8-2 is a timing diagram representative of timing windows established during a read operation of the disc drive of FIG. 1 through use of the data block format of FIG. 8-1.

FIG. 8-3 is a timing diagram representative of timing windows established during a read operation of the disc drive of FIG. 1 through the use of the data block format of FIG. 8-1, wherein a thermal asperity or other anomalous condition prevents the detection of a first sync word from the first sync field of the data block.

FIG. 8-4 is a timing diagram representative of timing windows established during a read operation of the disc drive of FIG. 1 through the use of the data block format of FIG. 8-1, wherein a thermal asperity or other anomalous condition prevents the detection of both the first and second sync words from the first and second sync fields, respectively, of the data block.

FIG. 10 provides a functional block diagram of a portion of the read channel of the disc drive of FIG. 1, additionally including a buffer to screen out the second sync word when the disc drive achieves synchronization from the first sync word of the first sync field of the data block of FIG. 8-1.

DETAILED DESCRIPTION

In order to set forth various aspects of the present invention, it will be helpful to first briefly describe the construction and operation of a disc drive in which the present invention is particularly useful.

Figures 1, 2:
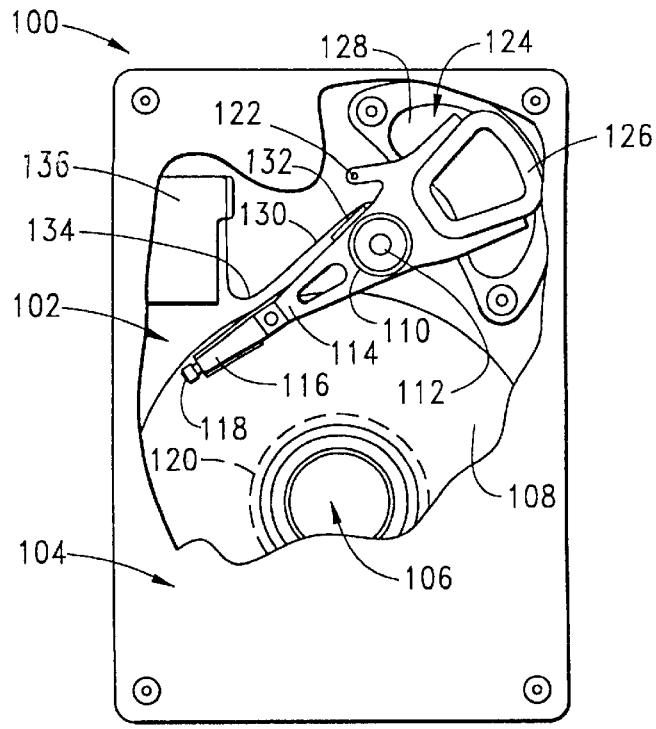
FIG. 1 is a top plan view of a disc drive constructed in accordance with the preferred embodiments of the present invention.
FIG. 2 is a functional block diagram of the disc drive of FIG. 1.

Turning now to the drawings and more particularly to FIG. 1, shown therein is a top plan view of a disc drive 100 constructed in accordance with the presently preferred embodiments of the present invention. The disc drive 100 includes a base deck 102 to which various disc drive components are mounted and a top cover 104, which is shown in a partial cut-away fashion to expose selected components of interest. Although not explicitly illustrated in the top plan view of FIG. 1, it will be readily understood that the base deck 102 cooperates with the top cover 104 to provide an internal, sealed environment for the disc drive 100.

Mounted to the base deck 102 is a spindle motor (shown generally at 106) to which a plurality of discs 108 are mounted for rotation at a constant high speed. Adjacent the discs 108 is an actuator assembly 110 which pivots about a cartridge bearing assembly 112 in a rotary fashion. The actuator assembly 110 includes actuator arms 114 which support flexures 116. The flexures 116 in turn support heads 118, with each of the heads 118 corresponding to a surface of one of the discs 108. As provided hereinabove, the heads 118 are positionably located over data tracks (not shown) of the discs 108 in order to read data from and write data to the tracks. At such time that the disc drive 100 is not in use, the heads 118 are moved to landing zones (denoted at broken line 120), which are located in FIG. 1 near the inner diameter of the discs 108. A latching arrangement (a pin of which is shown at 122) is used to secure the actuator assembly 110 when the heads 118 are moved to the landing zones 120.

Continuing with FIG. 1, the actuator assembly 110 is controllably positioned by way of a voice coil motor (VCM, shown generally at 124) comprising an actuator coil 126 immersed in the magnetic field generated by at least one permanent magnet 128. When current is passed through the actuator coil 126, an electromagnetic field is set up therein which interacts with the magnetic circuit of the VCM 124, causing the actuator assembly 110 to pivot about the cartridge bearing assembly 112 and the heads 118 to move across the surfaces of the discs.

To provide the requisite electrical conduction paths between the heads 118 and disc drive read/write circuitry (not shown in FIG. 1), head wires (not separately shown) are routed on the actuator assembly 110 from the heads 118, along the flexures 116 and the actuator arms 114 to a flex circuit assembly 130. Particularly, the head wires are secured to corresponding pads of a flex circuit board 132 which is connected to a flex 134 which terminates at a flex circuit bracket 136. Thus, the flex circuit assembly 130 facilitates communication between the actuator assembly 110 and a printed circuit board (PCB) mounted to the underside of the disc drive 100 (the PCB is not shown in FIG. 1). As will be recognized, the PCB houses the control electronics for the disc drive 100.

FIG. 2 provides a functional block diagram of the disc drive 100 of FIG. 1, operably connected to a host computer 140. As shown in FIG. 2, the disc drive 100 generally comprises a spindle control circuit 142, a servo control circuit 144 and a read/write channel 146, all operably connected to a system processor 150. It will be recognized that the system processor 150 communicates with and controls the operation of these circuits in a known manner, with the exceptions as discussed below. Additionally, an interface circuit 152 is shown connected to the read/write channel 146 and to the system processor 150, with the interface circuit 152 serving as a conventional data interface and buffer for the disc drive. The interface circuit 152 includes a sequencer (not separately shown) which comprises hardware used to establish varying timing sequences during the operation of the read/write channel 146.

As will be recognized, the spindle control circuit 142 controls the rotational speed of the spindle motor 106 (FIG. 1) in a conventional manner. For additional discussion regarding spindle control circuits, see U.S. Pat. No. 5,631,999 issued May 20, 1997 to Dinsmore, assigned to the assignee of the present invention.

The servo control circuit 144 of FIG. 2 is shown to receive servo position information from the head 118 and, in response thereto, provides a correction signal to the actuator coil 126 in order to position the head 118 with respect to the disc 108 (FIG. 1). As will be recognized, a dedicated servo system generally entails the use of at least one surface of the discs 108 as a servo surface, from which the alignment of the remaining heads relative to the corresponding disc surfaces can be achieved; alternatively, an embedded servo system entails the storage of both servo information and user data on each track on each of the surfaces of the discs. Although the disc drive 100 is contemplated as utilizing an embedded servo system so that both user data and servo information are stored on each of the tracks, it will be readily understood that the present invention is not so limited. For additional discussion regarding typical digital servo systems such as the servo control circuit 144, see U.S. Pat. No. 5,262,907 issued Nov. 16, 1993 to Duffy et al., as well as U.S. Pat. No. 5,136,439 issued Aug. 4, 1992 to Weispfenning et al., both of these references being assigned to the assignee of the present invention.

The read/write channel 146 operates to write data to the disc 108 in response to user data provided to the channel from the interface circuit 152 by encoding and serializing the data and generating a write current utilized by the head 118 to selectively magnetize portions of a selected track on the disc 108. Correspondingly, the previously stored data are retrieved by the read/write channel 146 by reconstructing the data from the read signals generated by the head 118 as the head passes over the selected track on the disc 108. The operation of the read/write channel 146 in accordance with the preferred embodiments of the present invention will be discussed in greater detail below.

It will be noted that the various operations of the disc drive 100 are controlled by the system processor 150, in accordance with programming stored in memory (MEM) 154. Those skilled in the art will recognize that typical disc drives include additional circuitry and functions beyond those delineated above, but such are only of general interest to the present discussion and accordingly do not warrant further description herein.

Referring now to FIG. 3, shown therein is a functional block diagram of a read channel 160 of the disc drive 100, the read channel 160 constituting the readback portion of the read/write channel 146 of FIG. 2. It will be recognized that additional components and features may typically be provided in the read channel 160 and further, selected operations of several of the components disclosed in FIG. 3 are controlled with inputs provided from, for example, the system processor 150 and the interface circuit 152 of FIG. 2; however, the read channel 160 of FIG. 3 is sufficiently detailed, in conjunction with the following description, to readily facilitate a thorough understanding of the present invention.

The read channel 160 employs partial response, maximum likelihood (PRML) signal processing, which as will be recognized involves time-domain equalization and self-synchronization of the read signal provided by the head 118. Particularly, time-domain equalization is used to reshape a readback signal received by the channel to an approximation of a desired target waveform in the time domain, such as used in PRML class PR-4 detection. Reshaping the readback signal allows intersymbol interference (ISI) to be reduced and controlled, facilitating reliable sequential decoding of the digital information stored on the disc. Such time-domain equalization is typically implemented through the use of a transversal equalizer/filter circuit (sometimes also commonly referred to as a "finite impulse response" circuit, or "FIR"). Moreover, self-synchronization involves synchronization of the rate of data recovery with the rate of incoming readback signals, which varies as a result of the speed of the rotating disc and the radial position of the associated head. Typically, such self-synchronization is achieved through the use of a phase locked loop (PLL) which generates clock signals for the sampling of equalized signals at appropriate moments and for the subsequent recovery of the stored data from the samples by way of a Viterbi decoder. Practical PRML read channel implementations are discussed, for example, in U.S. Pat. No. 5,422,760, issued Jun. 6, 1995 to Abbott et al. (digital transversal equalizer, timing and decoder circuitry), U.S. Pat. No. 5,459,757 issued Oct. 17, 1995 to Minuhin et al. (analog timing and decoder circuitry) and U.S. Pat. No. 5,592,340 issued Jan. 7, 1997 to Minuhin et al. (analog transversal equalizer circuitry), the latter two being assigned to the assignee of the present invention. It will be readily understood, however, that although the present invention is particularly suited to a channel employing PRML signal processing, the present invention is not so limited.

Continuing with FIG. 3, the read channel 160 is shown to comprise a threshold detector and preamp circuit 162 (hereinafter also referred to as "preamp") which operates to monitor the variations in the read voltage sensed across the MR element of the head 118, which is identified in FIG. 3 as an MR head. The preamp 162 provides threshold detection, preamplification and frequency domain filtering of the signal provided by the head 118.

More particularly, the preamp 162 monitors the variations in magnitude of voltage across the MR element of the head 118 and provides indications when the voltage exceeds a predetermined threshold bounding the nominal read voltage. Such detection is useful, for example, in detecting the occurrence of a thermal asperity. Thus, the preamp 162 utilizes a predetermined signal level threshold for the read voltage and provides indications when the threshold has been exceeded.

Additionally, the preamp 162 provides preamplification of the read signal from the head 118 to a level sufficient for processing by the remainder of the read channel 160. As discussed above, it is common to locate the preamp 162 (or portions thereof) on the flex circuit board 132 (FIG. 1) as it is typically desirable to place the circuit as close as possible to the heads 118.

The preamp 162 further preferably includes a high pass frequency domain filtering stage which reduces the effective duration of a thermal asperity by removing a significant amount of the energy in the read signal attributable to the thermal asperity event. More particularly, by choosing a suitable cutoff frequency, the durational effects of a typical thermal asperity event can be reduced from about 2 to 5 milliseconds down to about 300 to 500 nanoseconds. For a data transfer rate of 200 megabits per second (Mbits/sec), this results in a reduction in the number of affected bytes from 50–125 bytes down to about 8–13 bytes, which is well within the error correction capability of the read channel 160, as discussed below.

The cutoff frequency will be selected based upon the requirements of a particular read channel application, but a typical value will be around 6 megahertz (MHz). It also may be desirable to use a different cutoff frequency value for different zones in a disc drive employing the use of zone bit recording (ZBR).

Continuing with FIG. 3, the filtered output signal from the preamp 162 is provided to a variable gain amplifier (VGA) 164, which typically includes automatic gain control (AGC) to maintain a nominal signal amplitude for the remainder of the read channel 160. Additionally, the VGA 164 can be set to a fixed gain, useful during certain types of error recovery operations.

The amplified signal is then prefiltered by an adaptive prefilter 166 which generally operates as a low pass filter to remove higher frequency noise components from the signal. The frequency domain filtering characteristics of the adaptive prefilter 166 can be readily controlled through the use of control inputs (not shown) provided by, for example, the system processor 150.

The filtered output of the adaptive prefilter 166 is provided to a sample and hold circuit 168, which as will be recognized provides a series of discrete analog values in response to the input signal received by the circuit. These discrete analog values are then provided to a transversal equalizer 170, which as discussed above provides time domain equalization of the readback signal, filtering the signal to a close approximation of a selected class of PRML signaling (in this case PR-4).

The output of the transversal equalizer 170 is sampled (digitized) by an analog to digital (A/D) converter 172, and these samples are used by a timing and gain control circuit 174 to adjust the gain of the VGA 164. The timing and gain control circuit 174 further provides timing inputs to the sample and hold circuit 168 and to a phase locked loop (PLL, not separately shown) used by a Viterbi decoder 176 to decode read data from the samples obtained from the transversal equalizer 170.

The output from the Viterbi decoder 176 will comprise a digitally expressed data sequence corresponding to the encoded data originally written to the selected track. This output data sequence is provided to a sync word detector 178 which, when enabled by the sequencer of the interface circuit 152, proceeds to examine each successive set of bits in the output data sequence, searching for a unique pattern which enables the read channel 160 to synchronize with the user data. This unique pattern, or sync word, provides an indication that the following bits in the sequence are user data to be retrieved to the host. The sync word detector 178 can be implemented in either hardware or software and receives programmable inputs, so that particular target sync word patterns can be provided to the sync word detector 178 for each data sequence.

After passing through the sync word detector 178, the data sequence is provided to an 8/9 decoder 180, which converts each set of 9 bits (n+k bit pattern) stored to the disc 108 back to the original 8 bits (n bit pattern) of input data to remove the run length limited (RLL) encoding used to ensure reliable timing during the read recovery process. Although 8/9 encoding has been disclosed, it will be understood that other encoding rates can readily be utilized, such as 16/17. The output from the 8/9 decoder 180, which is typically characterized as a series of n-bit words, or symbols, is provided to a descrambler 182, which performs a selected logical operation upon each symbol using a set of descrambling words (or "keys") that rotate through a known sequence.

As will be recognized, the keys are initially used during a write operation to scramble the input sequence; such scrambling is typically used to randomize the data sequence, as it is known that PRML read channels (such as 160) can have widely varying error rates depending upon the receipt of particular data patterns. Thus, as the descrambler 182 processes any given symbol, the particular key that was initially used to scramble the symbol must be properly identified and used by the descrambler 182 to ensure the symbol is correctly descrambled.

The output sequence from the descrambler 182 is provided to an error correction code (ECC) circuit 184, which performs error detection and correction upon the received sequence (using, for example Reed-Solomon codes) and, if no uncorrectable errors are present, outputs user data on signal path 186 to the interface circuit 152 (FIG. 2) for subsequent transfer to the host computer 140.

As discussed in greater detail in U.S. Pat. No. 5,627,843 issued May 6, 1997 to Deng et al. and U.S. Pat. No. 5,276,662 issued Jan. 4, 1994 to Shaver et al., both of which are assigned to the assignee of the present invention, ECC encoding is initially performed by the write channel portion of the read/write channel 146 by appending a number of code symbols to the end of each selected portion of data symbols to generate encoded words (or interleaves) that mathematically map into a Galois field. That is, the code symbols are added to the data symbols so that the total set of symbols can be considered to be the coefficients of a polynomial having defined roots, so that only mathematically defined combinations can legally exist.

When an encoded word is retrieved, the word is compared to the set of defined combinations, so that encoded words containing read errors will generally not map into the set of defined combinations; thus, based upon the algorithm used by the ECC circuitry, illegal combinations can be detected and up to a selected number of the data symbols in such words can be changed in order to correct the presence of read errors therein. Once the data has been corrected, the code bits are stripped, allowing the originally recorded data to be output by the ECC circuit 184 to the interface circuit 152 and then on to the host computer 140. The ECC circuit is preferably implemented in hardware so that on-the-fly detection and correction can take place without the need for firmware intervention.

As will be recognized, different algorithms, or levels of ECC correction, can be used with the same encoding scheme to detect and correct different numbers of errors in the retrieved encoded words, or to provide different probabilities of detection and correction. Risks associated with ECC correction generally include both the erroneous correction of correct data and the non-detection of read errors in the retrieved data. Thus, an optimal level of ECC correction is typically chosen which balances the number of correctable errors, the probability of miscorrection of errors and the probability of misdetection of errors.

The ECC circuit 184 of FIG. 3 has the capability of correcting up to a maximum number (t) of erroneous data symbols and up to twice as many (2t) erasures, as is known in the art. As will be recognized, an erasure is an indication provided by selected circuits in the read channel 160 that a particular portion of the data stream has been corrupted, or otherwise includes errors. An example of an erasure pointer (EP) generator in the read channel 160 of FIG. 3 is the preamp 162, which indicates the occurrence of a thermal asperity as a result of the operation of the threshold detection portion of the circuit and provides an indication of the affected bytes to the ECC circuit 184. Another erasure pointer generator is the 8/9 decoder 180, which provides an indication to the ECC circuit 184 that a particular data symbol from the Viterbi decoder 176 contains an illegal combination of bits; a plurality of sequential illegal symbols will typically indicate the occurrence of a thermal asperity. It will be understood that the ability of the read channel 160 to efficiently utilize erasure pointers depends in part on the precision with which the affected bytes can be identified.

The ECC circuit 184 can thus correct up to v errors and u erasures, provided that:

$$u/2+v \leq t. \qquad (1)$$

As disc drives typically store 512 bytes of data per sector (data block) on the discs and typically employ Reed-Solomon encoding schemes using one code symbol for (up to) 255 bytes of data, each sector of data will typically have three to four code symbols for the data symbols stored in the sector. Accordingly, it is contemplated that the ECC circuit 184 can correct up to four errors in the data symbols associated with each code symbol (i.e., t=4) and can alternatively correct up to eight erasures in the data symbols for each code symbol (i.e., 2t=8). Hence, for a data block having four code words, up to 16 errors or up to 32 erasures can be corrected by the ECC circuit 184 in the user data stored in the data block.

Having concluded an overview of the disc drive 100 with respect to FIGS. 1 through 3, the manner in which servo information and user data fields are organized on a prior art embedded servo track will now be discussed. Such discussion will facilitate a thorough understanding of the various aspects of the invention which will be subsequently presented.

Turning now to FIG. 4-1, shown therein is a portion of a track 200 in a prior art disc drive which is generally similar to the disc drive 100 disclosed herein. The track 200 of FIG. 4-1 includes embedded servo blocks 202, which constitute servo information written to the track 200 by a servo track writer during manufacturing of the prior art disc drive.

The servo information of the servo blocks 202 is used by a servo control circuit (such as the servo control circuit 144 of FIG. 2) to control the position of a head (such as the head 118) relative to the track 200. Disposed between the servo blocks 202 are a total number of "n" data blocks 204, which generally define portions on the track 200 wherein user data supplied by a host computer (such as 140 in FIG. 2) are stored. The servo and data blocks 202, 204 are also sometimes referred to as "servo fields" and "data fields", respectively.

A selected number of the servo blocks 202 are commonly written to all of the tracks 200, with the start of each corresponding servo block 202 on each surface of the discs being radially aligned. Thus, the distance along the data tracks between servo blocks 202 generally varies with the radius of the track 200 and it has become common practice to vary the number of data blocks 204 between successive servo blocks accordingly. That is, a greater number of data blocks 204 are typically provided between servo blocks 202 near the outer diameter of the discs than near the inner diameter of the discs.

FIG. 4-2 shows the general layout of one of the data blocks 204 of FIG. 4-1. As shown in FIG. 4-2, the data block 204 first includes a phase locked oscillator (PLO), or 2T field 206 which, when read, enables a read channel (such as the read channel 160 of FIG. 3) to acquire the necessary timing and amplitude initialization information for the subsequent reading of the user data stored in the data block 204. Following the PLO field 206 is a service field 208, which is further subdivided as shown in FIG. 4-2 into a training field 210 (T) and a sync field 212 (S).

The training field 210 generally comprises a series of randomized data that enables the read channel to further optimize the tap weights used by the transversal equalizer (such as 170 in FIG. 3). As will be recognized, the training field 210 is typically included in disc drives incorporating transversal equalizers that do not otherwise possess sufficient self-adaptation characteristics.

The sync field 212 provides timing information with regard to the user data, the user data being stored in a user data field 214 immediately following the sync field 212. Thus, as will be recognized, proper operation of the read channel in response to the pattern of the sync field 212 enables the read channel to obtain frame lock, so that the read channel is ready to begin receipt of the user data from the user data field 214 at the appropriate time. As is known in the art, any number of patterns can be utilized for the sync field 212, with patterns containing a larger sequence of bits providing improved sync detection, but at the price of a corresponding increase in required overhead (and resulting reduction in user data storage capability for the disc drive).

Finally, an ECC code field 216 is appended at the end of the user data field 214, the ECC code field 216 having the previously discussed code words used by the ECC circuitry (such as 184 in FIG. 3) to perform error detection and correction upon the data symbols read from the user data field 214. The PLO field 206 and the service field (which comprises a training field 210 and a sync field 212) 208 are written by the head 118 during the same write operation that results in the writing of the user data and associated ECC code symbols to the user data and ECC code fields 214, 216, respectively.

As provided above, the data blocks 204 are generally contiguous in embedded servo systems; that is, as illustrated in FIG. 4-1, most of the data fields 204 will wholly reside within the user data area between successive servo fields 202. However, to optimize data storage capabilities it has become increasingly common to split selected data blocks 204 at locations where the servo fields 202 occur and such a prior art data block configuration will now be briefly discussed with reference to FIG. 4-3.

FIG. 4-3 sets forth the configuration of a non-contiguous data block 204' having a user data field which would otherwise be coincident with the servo field 202. Thus, the user data field is split into two portions (a first user data field 214' and a second user data field 214"), the respective lengths of which are dependent upon the relative location of the servo field 202.

Accordingly, the data block 204' has a first set of control fields (PLO field 206' and service field 208') to enable the read channel to recover the user data in the first user data field 214', the service field 208' comprising a training field 210' and a sync field 212'. After the servo field 202, a second set of control fields are provided comprising a second PLO field 206" and a second service field 208" (which in turn, comprises a second training field 210" and a second sync field 212"). The second set of control fields are used to enable the read channel to access the remaining user data stored in the second user data field 214". The code words associated with the user data are stored in a ECC code field 216' following the second user data field 214" as shown. Such a prior art approach is discussed, for example, in an article by Finch and Moczarny entitled HEADERLESS DISK FORMATTING: MAKING ROOM FOR MORE DATA, Data Storage, April 1997, pp. 51–54. It will be recognized, however, that this prior art approach is expressly utilized to accommodate the predetermined placement of the servo fields 202 with respect to the data blocks 204, 204'; hence, the length of the first and second user data fields 214', 214" of the data block 204' of FIG. 4-3 is wholly dependent upon the location of the servo field 202 relative to the data block 204'.

Referring now to FIG. 4-4, shown therein is a timing diagram representative of timing windows established by a sequencer (generally similar to the sequencer portion of the interface 152 of FIG. 2) during a read operation upon the contiguous data block 204 of FIG. 4-2. For purposes of clarity, FIGS. 4-2 and 4-4 have been vertically aligned to show the general relationships between the timing windows of FIG. 4-4 and the various fields of the data block 204 of FIG. 4-2.

As is known in the art, at the beginning of a read operation during which the user data stored in the data block 204 is to be retrieved, the associated head is moved to the selected track 200 and the sequencer waits until the selected data block 204 passes under the head. At such point that the selected data block 204 reaches the head, the sequencer opens a read window (also sometimes referred to as a "read gate" or "read enable"), as shown by 220 in FIG. 4-4. The read window 220 nominally defines a period of time during which the read channel is enabled to read the data block 204. Also at this point, a sync word search window is opened for a selected period of time, as shown at 222 in FIG. 4-4, during which a sync word detector (such as the sync word detector 178 of FIG. 3) searches for the appropriate sync word in the data sequence passed therethrough. As the read channel has been enabled, the receipt of the PLO and training information from the PLO and training fields 206, 210 operably tune the read channel in preparation of receipt of the user data in the user data field 214.

When the sync word is properly detected by the sync word detector, a sync signal is output to the interface circuit, as indicated at 224, and data transfer from the user data field 214 is initiated during a data transfer window, as indicated at 226. Once the read operation upon the data block 204 is completed, the read window 220 and the data transfer window 226 are closed.

From the foregoing, it will be understood that the proper detection of the sync word enables the read channel to recover the user data and associated ECC code words from the user data field 214 and the ECC code field 216. However, should a thermal asperity occur during the read operation, the read channel may not be able to properly synchronize with the user data, resulting in a read error being declared. Such a situation is generally illustrated in FIG. 4-5, which for purposes of discussion contemplates the occurrence of a thermal asperity (or other anomalous condition) coincident with the sync field 212.

As with the timing diagram of FIG. 4-4, FIG. 4-5 begins with the opening of a read window at 230 once the data block 204 reaches the associated head. At the same time, a sync word search window (indicated at 232) is opened, enabling the sync word detector to begin searching for the appropriate sync word pattern in the data sequence. However, the occurrence of a thermal asperity prevents the read channel from properly decoding any information from the data block 204 for a period of time during the sync word search window, and for purposes of illustration it is contemplated that the affected bits includes the sync word from the sync field 212. Thus, the sync word detector fails to properly detect the sync word during the sync word search window 232, which subsequently times out as shown.

The closing of the sync word search window without the outputting of the sync signal (as indicated by 234) causes the sequencer to close the read window 230. Consequently, no data transfer occurs (indicated by 236) and a read error is declared. Accordingly, the disc drive will proceed to attempt a variety of read error recovery operations, and if unsuccessful, will declare an uncorrectable error condition. As will be recognized, the presence of nontransient thermal asperities have typically had an adverse affect upon the performance of prior art disc drives and have necessitated the reallocation of the user data storage capacity of the affected data block through the use of well known defect mapping and reallocation techniques.

It has also been common practice in the industry to limit the maximum number of defective data blocks 204 which can be mapped out before the disc is designated as being unsuitable for use. As the location of thermal asperities relative to the prerecorded servo information can generally only be determined after a disc has been assembled into a disc drive and the servo information has been written, any disc found to be unusable results in expensive disassembly and rework operations, increasing overall manufacturing costs.

Moreover, as thermal asperities have been found to grow over time, disc drives placed into operational service will generally encounter thermal asperities at an increased frequency over the lives of the drives, which has been found to detrimentally affect the ability of the drives to reliably retrieve previously stored user data.

Having concluded a discussion of prior art data block formats with regard to FIGS. 4-1 through 4-5, various aspects of the present invention will now be discussed. Generally, the preferred embodiments of the present invention operate so as to minimize the possibility that an anomalous condition will compromise the integrity of a data block, and thus improve disc drive reliability during the operational life of the drive, as well as significantly reduce rework and scrap costs associated with the presence of an excessive number of unusable data blocks on a disc. The manner in which this is accomplished in accordance with the first preferred embodiment of the present invention will now be discussed, beginning with reference to FIG. 5-1.

FIG. 5-1 shows a data block 300 which has been formatted in accordance with the first preferred embodiment of the present invention. As set forth below, the data block 300 provides significantly improved immunity to thermal asperities and other anomalous conditions through the use of redundant sync fields.

Particularly, FIG. 5-1 shows the data block 300 to comprise a primary PLO field 302 ($PLO_1$) which, as with the prior art PLO field 206 of FIG. 4-2, preferably comprises a 2T pattern used by the read channel 160 of FIG. 3 to set timing and amplitude parameters for the subsequent data portions of the data block 300. The data block 300 further includes a primary service field 304, which in turn includes a primary training field 306 ($T_1$) and primary sync field 308 ($S_1$). The primary training field 306 and the primary sync field 308 are similar to the corresponding prior art fields 210 and 212 discussed above with reference to FIG. 4-2, in that the primary training field 306 preferably provides a random sequence of bits useful for further adaptation of the read channel 160 and the primary sync field 308 provides a unique pattern which allows the read channel 160 to begin reading user data from the data block 300 at the appropriate time.

Continuing with FIG. 5-1, the data block 300 next comprises a secondary PLO field 310 ($PLO_2$) and a secondary service field 312, with the secondary service field 312 being further divided into a secondary training field 314 ($T_2$) and a secondary sync field 316 ($S_2$). The secondary PLO field 310 is similar in construction and operation to the primary PLO field 302, and the secondary service field 312 is similar in construction and operation to the primary service field 304. The distance between the primary and secondary sync fields 308, 316 and hence, the lengths of the secondary PLO and training fields 310, 314, are determined in a manner to be discussed in greater detail below.

Finally, FIG. 5-1 shows the data block 300 to include a user data field 318 and an ECC code field 320, which are functionally similar to the corresponding prior art fields 214 and 216 of FIG. 4-2. The operational advantages of the data block 300 of FIG. 5-1 will now be discussed, beginning with FIG. 5-2.

FIG. 5-2 provides a timing diagram representative of timing windows established by the sequencer (of the interface 152 of FIG. 2) during a read operation upon the data block 300 of FIG. 5-1. For purposes of clarity, FIGS. 5-1 through 5-4 have been vertically aligned to show the general relationships between the timing windows of FIGS. 5-2 through 5-4 and the various fields set forth in the data block 300 of FIG. 5-1. Moreover, FIG. 5-2 has been provided to first describe nominal operation of the disc drive 100 (i.e., in the absence of a thermal asperity or other anomalous condition).

At the beginning of the read operation, the head 118 is moved to the selected track and the sequencer waits until the selected data block 300 passes under the head 118, at which point a read window is opened, as shown by 322 in FIG. 5-2. As discussed below, the read window defines periods of time during which the read channel 160 is enabled for the read operation associated with the data block 300.

A sync word search window 324 is also opened, enabling the sync word detector 178 (FIG. 3) to initiate a search for both the primary and secondary sync words in the data sequence. As described more fully below, the primary and secondary sync words (from the primary and secondary sync fields 308, 316) will preferably comprise different patterns so that the receipt of each can be independently discerned. In a fashion similar to that of the prior art, PLO and training information is provided to the read channel 160 during such time that the sync word search window remains open.

When the sync word detector 178 properly detects the primary sync word, the sync word search window 324 is closed and a predetermined delay is initiated, as indicated by 326. The read window 322 is also temporarily closed for the duration of the delay 326, as shown. It will be recognized that the length of the delay is selected so that the beginning of the delay will generally correspond with the passage of the primary sync field 308 under the head 118, and the delay will continue until a point in time is reached that generally corresponds with the passage of the secondary sync field 316 under the head. At the conclusion of the delay 326, the read window 322 is reopened, a sync signal is output (328), and data transfer is subsequently initiated upon the user data and the ECC code words in the user data and ECC code fields 318, 320 (as indicated by 330).

From the foregoing description of FIG. 5-2, it will be recognized that under normal operating conditions the disc drive 100 will proceed with a search for the primary and secondary sync words and once the primary sync word is acquired, the read channel 160 will be temporarily disabled until the user data field 318 reaches the head 118. Such temporary disabling of the read channel 160 is performed so that, should a thermal asperity occur in the data block 300 in the control fields immediately after the primary sync field 308, the previously established tuning and synchronization of the read channel 160 will not be adversely affected.

However, in the event that a thermal asperity (or other anomalous condition) prevents the proper detection of the primary sync word, the user data can still be accessed from the data block 300 through the use of the secondary sync word from the secondary sync field 316. Such a condition is discussed below with reference to FIG. 5-3.

FIG. 5-3 provides a timing diagram illustrating the operation of the disc drive 100 in reading the data block 300 of FIG. 5-1 when the sync word detector 178 (FIG. 3) fails to detect the primary sync word. Particularly, when the data block 300 reaches the head 118, the sequencer opens a read window 332, enabling the read channel 160. At the same time, the sequencer opens a sync word search window 334, during which the sync word detector 178 proceeds to search for the primary and secondary sync words. During the period of time that the sync word search window is open, the tuning information from the various control fields of the data block 300 is used to prepare the read channel 160 for receipt of the user data in the user data field 318.

As contemplated in the present example, the sync word detector 178 fails to detect the first sync word from the primary sync field 308; thus, no delay is initiated (indicated by 336). However, the sync word detector 178 continues the search and ultimately detects the secondary sync word as the secondary sync field 316 passes under the head. Accordingly, the sync word detector 178 outputs a sync signal (indicated by 338) and a data transfer window is opened, 340, during which the user data and ECC code words are recovered from the user data and ECC code fields 318, 320. Once the sync signal is output, 338, the sync word search window 344 is closed, but the read window 332 remains open until the data transfer is completed.

As will be recognized, the use of the secondary sync word from the secondary sync field 316 enables the user data from the data block 300 to be recovered when the primary sync word from the primary sync field 308 is not detected. Accordingly, it is preferable to separate the primary and secondary sync fields 308, 316 by a distance sufficient to enable at least one of the fields to be properly decoded in the presence of a thermal asperity. As discussed above, the preamp 162 (FIG. 3) provides high frequency filtering so that the duration of a typical thermal asperity will be limited to a relatively short amount of time, such as 300 to 500 nanoseconds, only effecting about 8 to 13 bytes of information in the data block 300. Thus, the combined length of the secondary PLO and training fields 310, 314 should be selected to be greater than the number of bytes that would be adversely affected by an average thermal asperity (i.e., greater than 13 bytes in the present example). Moreover, the primary and secondary sync word patterns should be selected to have a maximum Hamming distance from the patterns used for the PLO and training fields in order to maximize the probability of sync word pattern detection.

To further describe the operation of the disc drive 100 in utilizing the data block 300 of FIG. 5-1, FIG. 5-4 has been provided which shows a timing diagram for the unlikely case when the sync word detector 178 fails to detect both primary and secondary sync words.

As shown in FIG. 5-4, once the data block 300 reaches the head 118, a read window 342 and a sync word search window 344 are opened, during which the read channel 160 receives the tuning information from the primary PLO and training fields 302, 306 and the sync word detector 178 searches for both the primary and secondary sync words in the received sequence. However, in this case it is contemplated that the sync word detector 178 fails to detect either of the sync words; thus, the sync word search window 344 times out. Further, no delay is initiated (indicated by 346) and no sync signal is output (indicated by 348); thus, the read window 342 is closed and no data transfer occurs, as shown by 350. In such a case, a read error is declared and the disc drive 100 enters a conventional read error recovery operation.

Having discussed the operation of the disc drive 100 in accordance with the timing diagrams of FIGS. 5-2 through 5-4, FIG. 6 has now been provided which illustrates a generalized flow chart for a DUAL SYNC READ OPERATION routine performed by the disc drive 100 during a read operation upon the data block 300 of FIG. 5-1. As will be recognized, the routine is performed through the coordinated efforts of the head 118, the system processor 150, the interface circuit 152 and the servo control circuit 144 (all shown in FIG. 2) and the read channel 160 (FIG. 3).

Figure 6:
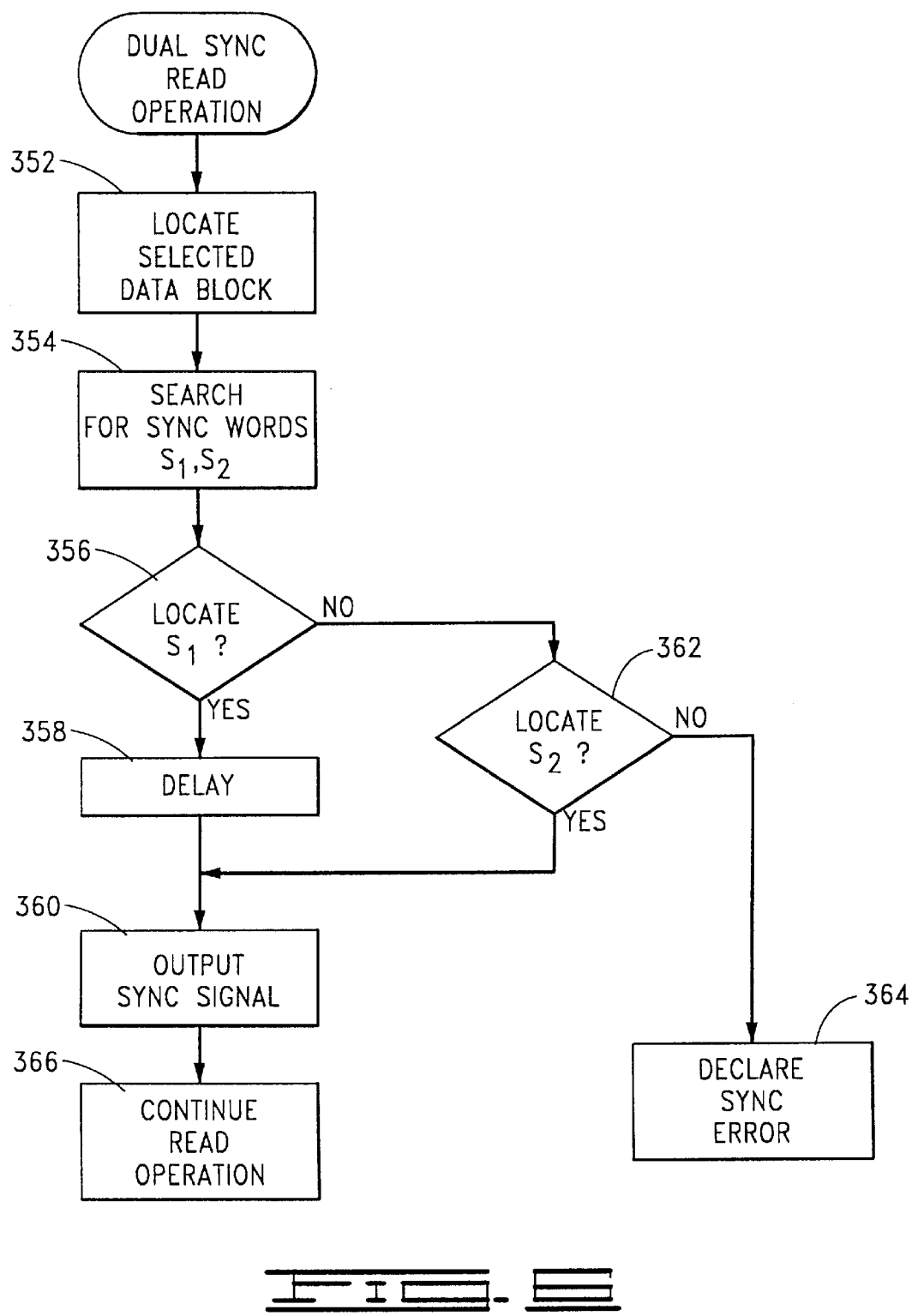
FIG. 6 is a flow diagram representing the operation of the disc drive of FIG. 1 in accordance with the first preferred embodiment of the present invention.

With reference to FIG. 6, the disc drive 100 first locates the selected data block 300, as indicated by block 352. As will be recognized, block 352 may include the requirement for a seek operation during which the head 118 is moved to a target track having the selected data block 300, as well as a latency period during which the disc drive 100 waits until the selected data block 300 reaches the head 118 once the head 118 is disposed over the target track.

Once the selected data block 300 is located, the disc drive 100 initiates a search for the primary and secondary sync words ("S$_1$" and "S$_2$") as indicated by block 354. As discussed above, block 354 includes the opening of a read window (such as 322, 332 or 342 of FIGS. 5-2 through 5-4) and the opening of a sync word search window (such as 324, 334 or 344), during which the sync word detector 178 (FIG. 3) examines each successive portion of the received data sequence.

Decision block 356 next inquires whether the primary sync word has been located, and if so, initiates a delay at block 358. As will be recognized, the delay (326 of FIG. 5-2) corresponds to the amount of time the head 118 will require to pass from the primary sync field 308 to the secondary sync field 316 (and in the present example is contemplated as being around 500 nanoseconds). Moreover, the read channel is disabled during this delay and the sync word search window is closed, as shown in FIG. 5-2. At the conclusion of the delay of block 358, the sync signal is output by the sync word detector 178, as shown by block 360.

Returning to the decision block 356, should the sync word detector 178 fail to locate the primary sync word, the flow passes to decision block 362 which inquires whether the secondary sync word has been located; if so, the flow passes to block 360 as shown. However, should the sync word detector 178 fail to locate the secondary sync word, the flow passes from the decision block 362 to block 364, wherein a sync error is declared and the disc drive 100 initiates a read error recovery routine upon the data block 300.

Finally, upon the outputting of the sync signal, block 360, the read channel 160 proceeds to recover the user data and code words from the user data and ECC code fields 318, 320, as indicated by block 366.

It will now be recognized that an important advantage of the present invention over the prior art lies in the fact that a sync error will generally only occur when a thermal asperity (or other anomalous event) affects both the primary and secondary sync fields 308, 316. FIG. 7 provides a statistical comparison of the benefits of the present invention over the prior art.

Referring now to FIG. 7, shown therein is a graph comparing estimated read error rate performance between the prior art data block format of FIG. 4-2 and the data block format of FIG. 5-1. Particularly, the graph provides a horizontal axis representing a logarithmic time scale indicative of the number of test days during which a disc drive is continuously operated. The graph further provides a vertical axis having linear exponential scaling representative of the number of thermal asperities, expressed in parts per million (ppm), that will generally result in the inability of the disc drive 100 to access user data in a sector. The number of unrecoverable data errors for the prior art data block format of FIG. 4-2 is plotted using diamond-shaped marks (identified at 370), while the corresponding number of unrecoverable errors using the data block format of FIG. 5-1 in accordance with the first aspect of the present invention is plotted using square marks (identified at 380).

As shown in the graph, it is estimated that, by the tenth day of continuous testing, the number of nonrecoverable errors encountered using the prior art data block format of FIG. 4-2 would be on the order of $1.00 \times 10^5$ ppm, while at the same time interval, no nonrecoverable errors would arise using the data block format of FIG. 5-1. At 100 days, the number of nonrecoverable errors using the prior art format would rise to $1.00'10^6$ ppm, while the format of FIG. 5-1 continues to provide error-free estimates. Indeed, it is only when the testing interval is extended to 1000 days, and the estimated number of nonrecoverable errors has reached $9.45 \times 10^6$ ppm using the prior art format, that the number of errors detected with the format of FIG. 5-1 rises to $1.05 \times 10^1$ ppm. Thus, the present invention can be expected to greatly increase the number of discs that be usable in spite of the presence of thermal asperities, thus reducing scrap and rework costs. It also means that disc drives manufactured in accordance with the present invention will have a greater tolerance to "grown" thermal asperities, inasmuch as any one grown thermal asperity will be much less likely to cause a fatal error, thus increasing the reliability of the disc drive and extending disc drive useful service life.

Having concluded the discussion of the first aspect of the present invention, reference is now made to FIG. 8-1, which illustrates an alternative data block 400 formatted in accordance with a second aspect of the present invention. As with the data block 300 discussed above, the data block 400 makes use of redundant control fields to provide improved read channel performance and immunity to thermal asperities.

The data block 400 comprises a PLO field 402 which, as with the PLO field 206 (FIG. 4-2) and the primary and secondary PLO fields 302, 310 (FIG. 5-1), preferably comprises a 2T pattern used by the read channel 160 to set timing and amplitude parameters for the subsequent data portions of the data block 400. The data block 400 further comprises a service field 404 having a training field 406 (T) and a first sync field 408 (also referred to as "$S_1$" and "sync1"). Again, the training field 406 provides a random sequence of bits useful for further adaptation of the read channel 160 and the sync1 field 408 provides a unique pattern (sync1 word) which allows the read channel 160 to begin reading user data stored in the data block 400 at the appropriate time.

Continuing with FIG. 8-1, the data block 400 further comprises a first user data field 410 (also referred to as "data1"), a second sync field 412 ("$S_2$" or "sync2") a second user data field 414 ("data2 field") and an ECC code field 416.

The sync2 field 412 is functionally similar to the secondary sync field 316 of FIG. 5-1, in that the sync2 field 412 is provided to facilitate proper synchronization of the user data stored in the data block 400 in the event that a thermal asperity prevents proper decoding of the sync1 word of the sync1 field 408. However, the data block 400 is configured so as to place user data between the two sync fields 408, 412. That is, during the associated write operation an initial portion of the user data is stored in the data1 field 410, the sync2 field 412 is written, and then the remaining portions of the user data are stored in the data2 field 414.

Accordingly, it is generally preferable to use "illegal" patterns for the sync words in the sync1 and sync2 fields 408, 412 in order to enhance the ability of the read channel to properly distinguish the sync words from the rest of the user data. For example, for the read channel 160 of FIG. 3 wherein the 8/9 decoder 180 decodes each sequence of nine bits of data written to the disc to the corresponding eight bits of user data, there will generally be 256 such illegal patterns from which to choose appropriate sync words (correspondingly, the use of 16/17 encoding would result in a total of 65,536 such illegal patterns). Of course, depending upon the application the sync1 word might be the same as, or different from, the sync2 word.

The sync words should preferably have maximum Hamming and Euclidean distances from all legal user data symbols. As will be recognized, the Hamming distance between two sequences is the total number of different bits in each of the sequences and the Euclidean distance is the square of the Hamming distance. Increasing the Hamming and Euclidean distances provides a greater assurance that the sync words will be readily distinguishable from the user data. For the same reason, it is also preferable that the sync words have maximum Hamming and Euclidean distances from all shifted combinations of bits from any combination of legal user data symbols (that is, an n-bit sync word should be distinguishable from any n-bit combination of bits in any sequence of legal user data symbols).

It has further been found advantageous to select a sync word with a moderate number of flux reversals (that is, without either high or low frequency components). Other factors that may be considered include error rate, Viterbi sampled amplitude margin, root mean squared (RMS) error, margin distribution, amplitude asymmetry, nonlinearities and various head/media parametrics.

As will be recognized, a sync word does not necessarily have to be the same length as legal user symbols; in practice, increasingly improved detection rates have been obtained from sync words of increasingly greater length (such as 20 bits or more). Ultimately, the sync words will be selected based on the various requirements of a particular application. Computer searching techniques, known to those skilled in the art, can readily be employed in determining candidates for the sync words which can then be individually evaluated.

The physical distance along the track between the sync1 and sync2 fields 408, 412, and hence the amount of user data stored therebetween in the data1 field 410, is selected to be within the error detection and correction capabilities of the ECC circuit 184 (FIG. 3). As discussed above, the read channel 160 is contemplated as being capable of correcting up to 32 erasures (i.e., 32 erroneous bytes with known locations within the data sequence) in each data block 400; thus, the data1 field 410 of the present example could store up to 32 bytes of user data. It should be pointed out that the exact location of the user data in the data1 field 410 relative to the data stream will be known so that the erasure pointer methodology described herein could be readily utilized, but without the usual need for an external signal from an erasure pointer generator.

Moreover, it is advantageous to separate the sync1 and sync2 fields 408, 412 by a sufficient physical distance along the track so that the occurrence of a single thermal asperity will not likely prevent the detection of both sync1 and sync2 words. As provided above, for a data transfer rate of 200 megabits per second (Mbits/sec), use of the high pass filtering of the preamp 162 (FIG. 3) will reduce the effective duration of a typical thermal asperity down to from about 300 to 500 nanoseconds, correspondingly affecting about 8–13 bytes. Thus, in the present example the amount of user data that would preferably be stored in the data1 field 410 would be from as few as 13 bytes up to a maximum of 32 bytes. The actual number of bytes, of course, would be selected based upon the requirements of a particular application and would likely be less than the maximum number of erasures that could be corrected, in order to retain some margin for the reading of the rest of the user data in the data2 field 414.

Referring now to FIG. 8-2, shown therein is a timing diagram illustrating the operation of the disc drive 100 during a read operation upon the data block 400 of FIG. 8-1. As with the previously discussed timing diagrams of FIGS. 4-4, 4-5, 5-2, 5-3 and 5-4, the timing diagrams of FIGS. 8-2 through 8-4 have been vertically aligned with the data block 400 of FIG. 8-1 to facilitate a clearer understanding of the operation of the disc drive 100 upon the data block 400. It will be recognized that the timing sequence of FIG. 8-2 describes normal operation of the disc drive 100, in that no thermal asperities (or other anomalous conditions) are contemplated as being present.

At such time that the data block 400 is detected by the head 118, the sequencer opens a read window 422 and a sync1 search window 424. The read window 422 enables the read channel 160 (FIG. 3) and the sync1 search window 424 enables the sync word detector 178 (FIG. 3), which initiates a search for the sync1 word from the sync1 field 408. As will be recognized, the control information from the PLO and training fields 402, 406 tune the read channel 160 in anticipation of the user data of the data1 and data2 fields 410, 414.

When the sync word detector 178 successfully detects the sync1 word, the sync word detector 178 outputs a sync signal to the sequencer (as indicated by 428) and closes the sync1 search window, 424. As the sync1 word was detected, a sync2 search window, shown at 426, is not opened; that is, once the sync1 word is found, no corresponding search for the sync2 word from the sync2 field 412 is performed.

The outputting of the sync signal results in the initialization of a data transfer of the remaining information in the data block 400, as indicated by a data transfer window 430. During this transfer, the user data of the data1 field 410 is read, followed by the sync2 word of the sync2 field 412, the user data of the user data2 field 414 and the ECC code symbols in the ECC code field 416. As the distance between the sync1 and sync2 fields 408, 412 is known, the sequencer can readily locate and remove the bits associated with the sync2 word from the recovered data before transferring the decoded user data to the host 140 (FIG. 2). Alternatives to this manner of operation by the sequencer will be discussed below.

Referring now to FIG. 8-3, shown therein is another timing diagram for the data block 400 of FIG. 8-1, illustrating the occurrence of a thermal asperity (or other anomalous condition) which prevents detection of the sync1 word.

A read window 432 is opened at such time that the head 118 reaches the data block, enabling the control information from the PLO and training fields 402, 406 to tune the read channel 160. At the same time, a sync1 search window is opened, 434, during which the sync word detector 178 searches for the sync1 word. The sync1 search window 434 remains open for a preselected amount of time, and when the sync1 word is not detected, the sync1 search window 434 is closed in favor of a sync2 search window 436, as shown, during which the sync word detector 178 initiates a search for the sync2 word.

At such time that the sync2 word is located by the sync word detector 178, the sync signal is output to the sequencer, as indicated by 438, the sync2 search window 436 is closed, and data transfer (indicated at 440) is initiated upon the user data in the data2 field 414 and the ECC code symbols of the ECC code field 416. The read channel 160 will thus proceed to read the user data in the data2 field 414 and reconstruct the user data from the data1 field using the ECC code symbols recovered from the ECC code field 416.

It will be recalled from the discussion above that the read channel 160 (FIG. 3) includes the use of the descrambler 182 to descramble the readback symbols using a sequence of descrambling keys which correspond to the scrambling keys used by the write channel portion of the read/write channel 146 (FIG. 2) to write the user data to the disc 108. Accordingly, at such time that the sync1 word is not detected, the read channel 160 begins reading the user data at the data2 field 414. Thus, it is contemplated that the retrieval of the user data beginning at the data2 field 414 will require the sequencer to update the descrambler 182 to the proper descrambling key, jumping ahead in the sequence a sufficient number of iterations to account for the gap caused by the missing user data from the data1 field 410. However, other implementations are readily contemplated, including having the descrambler state determined by the particular sync word detected and moving the scrambler/descrambler operation to the sequencer so as to not be a factor within the read channel itself. Moreover, depending upon the application the user data from the data2 field 414 may need to be advanced in the buffer of the interface circuit 152 to make room for the user data from the data1 field 410 that is recovered by way of ECC reconstruction.

Finally, FIG. 8-4 provides a timing diagram for a read operation upon the data block 400 of FIG. 8-1, illustrating the relatively infrequent occurrence when the sync word detector 178 fails to detect both the sync1 and sync2 words.

As before, passage of the data block 400 under the head 118 causes the opening of a read window 442 and a sync1 search window 444. After the sync word detector 178 fails to locate the sync1 word, the sync1 search window 444 times out and a sync2 search window is opened, 446, during which the sync word detector 178 searches for the sync2 word.

At such time that the sync word detector 178 also fails to locate the sync2 word, the sync2 search window times out, as shown, which leads to the corresponding closing of the read window 442. As shown in FIG. 8-4, no sync signal is output to the sequencer (as indicated by 448) and no data transfer occurs (as indicated by 450).

Figure 9:
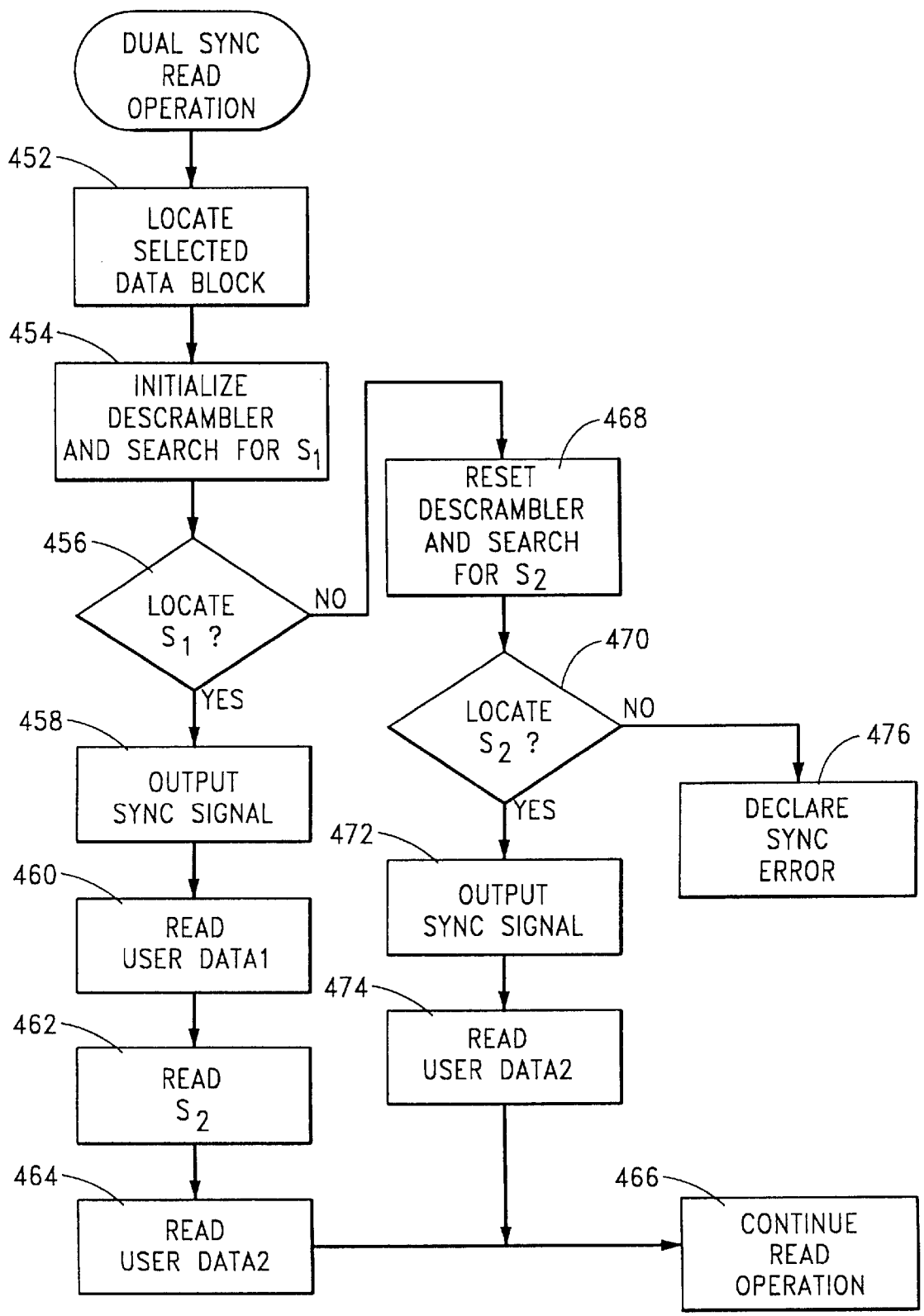
FIG. 9 is a flow diagram representing the operation of the disc drive in accordance with the second preferred embodiment of the present invention.
Figure 16:
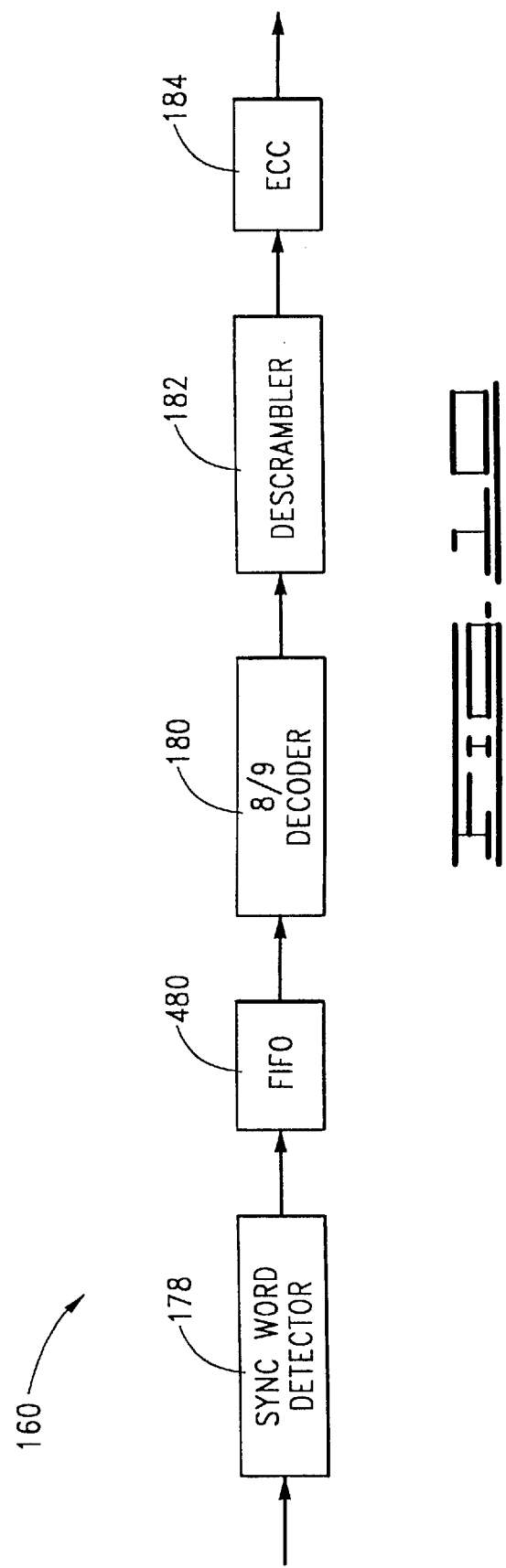

Having concluded a discussion of the operation of the disc drive 100 in accordance with the timing diagrams of FIGS. 8-2 through 8-4, reference is now made to FIG. 9, which illustrates a generalized flow chart for an alternative DUAL SYNC READ OPERATION routine performed by the disc drive 100 during a read operation, this time for the data block 400 of FIG. 8-1. As with the routine of FIG. 6, the routine of FIG. 9 is performed through the coordinated operation of the head 118, the system processor 150, the interface circuit 152, the servo control circuit 144, and the read channel 160.

As shown in FIG. 9, the disc drive 100 first locates the selected data block 400 as shown by block 452, which depending upon the initial location of the head 118, may include a seek operation to move the head 118 to the target track having the selected data block 400 and a latency period during which the disc drive 100 waits until the data block 400 reaches the head 118.

At such time that the data block 400 is located, as shown by block 454 in FIG. 9 the read channel 160 is enabled (through the opening of a read window such as 422 in FIG. 8-2), the descrambler 182 is initialized with the appropriate descrambling key and the sync word detector 178 begins searching for the sync1 word (through the opening of a sync1 search window such as 424 in FIG. 8-2).

Decision block 456 determines whether the sync1 word has been located; if so, the routine passes to block 458, wherein the sync signal is output to the sequencer (as indicated by 428 in FIG. 8-2). Data transfer is then initiated (as indicated by 430 in FIG. 8-2) and the read channel 160 proceeds to read the user data from the data1 field 410, the sync2 word from the sync2 field 412 and the remaining portions of the user data from the data2 field 414, as indicated by blocks 460, 462 and 464, respectively. As described above, the sync2 word is not utilized at this time to synchronize the read channel 160; rather, the sync2 word is read just like the user data from the data1 and data2 fields 410, 414 and subsequently removed by the interface circuit 152 (or buffered out of the channel, as discussed below). Finally, the read operation continues in a conventional fashion, as indicated by block 466, including the reading of the ECC code symbols from the ECC code field 416, the application of error detection and correction operations as required by the ECC circuit 184 (FIG. 3), and the transfer of the user data to the host computer 140 (FIG. 2).

If the sync1 word is not located, however, as indicated by the decision block 456 the flow passes to block 468 wherein the descrambler 182 is reset to the new descrambling key and the sync word detector 178 proceeds to search for the sync2 word (as indicated by 436 in FIG. 8-3). Decision block 470 then determines whether the sync2 word has been located; if so, the flow passes to block 472 wherein the corresponding sync signal is output to the sequencer (as indicated by 438 in FIG. 8-3) and the read channel 160 proceeds in block 474 to read the user data from the data2 field using the synchronization timing acquired from the sync2 word. The flow then passes to block 466, wherein the read operation continues as before, but this time including the step of reconstructing the user data from the data1 field 410 that was not recovered due to failure to detect the sync1 word using conventional ECC techniques.

Finally, when the sync2 word is also not detected, as shown by decision block 470 the flow passes to block 476, wherein a sync error is declared.

Having concluded the discussion of the format of the data block 400, various additional considerations will now be briefly addressed. First, as discussed above the sequencer preferably discards the second sync word pattern read from the sync2 field 412 of the data block 400 when proper synchronization is achieved from the sync1 field 408 (which is contemplated as being the typical case during operation). However, it is contemplated that the read channel 160 could alternatively be provided with a first-in-first-out (FIFO) buffer 480, as generally illustrated in FIG. 10. That is, each successive data symbol or set of data symbols in the read channel 160 could be temporarily buffered in the FIFO 480. The sync2 word pattern from the sync2 field 412 then could be removed from the data sequence by instructing the FIFO 480 to not output the bits corresponding thereto in response to detection of the sync1 word pattern by the sync word detector 178. An advantage of this approach is that the ECC 184 (and the interface circuit 152) would not have to deal with the second sync word pattern at all. Of course, the FIFO 480 could be located within the read channel 160 at other locations besides immediately following the sync word detector 178 as shown in FIG. 10.

Second, in the preferred embodiments discussed above the read channel 160 opens a first search window to search for the first sync word and then opens a second search window to search for the second sync word; however, alternative approaches are readily contemplated. For example, a disc drive could be configured to just search for the first sync word during normal operation and then only search (and use) the second sync word during a read error recovery routine when the first sync word is not detected. Additionally, the sync word detector 178 could be configured to search for both sync words simultaneously and the sequencer could direct the operation of the read channel 160 in accordance with which sync word was detected.

As for the patterns of the sync words, the preferred embodiments disclosed above contemplate the use of illegal patterns and bit-lengths potentially longer than that of the user data symbols. However, depending upon the particular application, the same sync pattern could be used for both the first and second sync words, provided the read channel can adequately distinguish therebetween (for example, through the timing of different search windows). Moreover, it is contemplated that the first and second sync words might advantageously have different bit-lengths, again depending upon the particular application.

It will be appreciated that the occurrence of thermal asperities and other anomalous conditions may be detected in a variety of ways by various components of a disc drive read channel and that such detection methodologies could advantageously be utilized in conjunction with the practicing of the present invention without departing from the scope and spirit thereof as disclosed herein and claimed below.

Accordingly, it will be recognized that there are particular advantages associated with the data field formats discussed above. For example, the format of the data block 300 (FIG. 5-2) will provide significant immunity to thermal asperities as a result of the redundant set of control fields provided in each of the data blocks 300. However, it will be recognized that the use of such additional control fields will generally decrease the amount of track space available to store user data and hence, will tend to decrease the user data storage capacity of the disc drive.

The data block 400 will also provide significantly improved immunity to thermal asperities over the prior art. Additionally, the data block 400 will generally require less disc overhead to implement, facilitating somewhat greater data storage capacity for the disc drive 100 over the format used in the data field 300. This is because the format of the data block 400 places a portion of the user data between the two sync fields 408, 412 (FIG. 8-1). However, the use of the format of the data block 400 generally reduces the error correction margin available from the ECC circuit 184; that is, should the read channel 160 fail to detect the sync1 word, most of the error correction margin will be needed to recover the user data in the data1 field 410, reducing the ability of the read channel 160 to correct a large number of read errors in the user data recovered from the data2 field.

Accordingly, in view of the above it will be understood that the present invention generally comprises an apparatus and method for minimizing the effects of thermal asperities and other anomalous conditions on the read performance of a disc drive (such as 100). A contiguous data block (such as 300, 400) is provided having a first sync field (such as 308, 408) wherein is stored a sync pattern for use in synchronizing a read channel (such as 160) with user data stored in the data block. A second sync field (such as 316, 412) is also provided in the data block, the second sync field also enabling the read channel to synchronize with the user data in the data block.

A control field (such as PLO and training fields 310, 314) is disposed between the first and second sync fields, the control field having a control pattern (such as a 2T or training pattern) used by the read channel to prepare for receipt of the user data; alternatively, a portion of the user data is stored in a first user data field (such as 410) disposed between the sync fields. The sync fields are separated by a sufficient distance to enable recovery of the user data by the read channel when an anomalous condition prevents the sync word pattern of the first sync field from synchronizing the read channel.

For the purposes of the claims appended below, the phrase "contiguous data block" will be understood consistently with the foregoing discussion to describe a data block that does not have a servo field coincident with user data portions of the data block (in contrast for example to the data block of FIG. 4-3). Moreover, for purposes of the appended claims, the phrase "set of control fields" will be readily understood to encompass one or more control fields.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A format for a contiguous data block of a disc drive which employs an encoding scheme to encode n bit patterns of input user data into corresponding legal n+k bit patterns of encoded user data, the disc drive having a rotatable disc and a controllably positionable head used to store the encoded user data in the data block, the disc drive further having a read channel responsive to the head for recovering the encoded user data from the data block and decoding the encoded user data to output the original input user data, the data block format comprising:

a user data field to which encoded user data are stored;

a first sync field preceding the user data field having a first sync pattern for synchronizing the read channel to enable the read channel to recover the encoded user data from the user data field; and a second sync field preceding the user data field and disposed between the first sync field and the user data field having a second sync pattern different from the first sync pattern for synchronizing the read channel to enable the read channel to recover the encoded user data from the user data field when the first sync pattern fails to synchronize the read channel, wherein the first and second sync fields are separated within the data block by a sufficient distance to enable recovery of the encoded user data from the user data field when an anomalous condition prevents detection of the first sync pattern, and wherein the second sync pattern comprises an illegal n+k bit pattern to facilitate differentiation of the second sync pattern from the legal n+k bit patterns of the encoded user data in the user data field.

2. The data block format of claim 1, further comprising:

a control field disposed between the first and second sync fields, the control field having a control pattern used by the read channel to prepare for receipt of the encoded user data.

3. The data block format of claim 1, wherein the anomalous condition is a thermal asperity and the distance separating the first and second sync fields is sufficient to prevent the thermal asperity from affecting both the first and the second sync fields.

4. The data block format of claim 1, wherein the user data field is characterized as a second user data field and wherein the data block format further comprises a first user data field disposed between the first and second sync fields, wherein a portion of the encoded user data is stored in the first user data field and remaining portions of the encoded user data are stored in the second user data field.

5. In a disc drive of the type having a rotatable disc and a controllably positionable head used to store encoded user data in a plurality of contiguous data blocks on tracks of the disc using an encoding scheme wherein n bit patterns of input user data are encoded into corresponding legal n+k bit patterns of encoded user data, each of the data blocks having a user data field wherein the encoded user data are stored and a preceding set of control fields providing control information to a read channel of the disc drive to facilitate recovery of the encoded user data from the data block and decoding of the encoded user data to output the original input user data, the set of control fields including a sync field having a sync pattern for synchronizing the read channel with the encoded user data, the improvement comprising:

a secondary sync field disposed within each contiguous data block of the disc drive a selected distance from the sync field, the secondary sync field disposed between the sync field and the user data field and having a second sync pattern different from the sync pattern of the sync field, the secondary sync field separated from the sync field a sufficient distance to enable the secondary sync field to synchronize the read channel to recover the encoded user data from the user data field at such time that an anomalous condition prevents the sync field from synchronizing the read channel, wherein the second sync pattern comprises an illegal n+k bit pattern to facilitate differentiation of the second sync pattern from the legal n+k bit patterns of the encoded user data in the user data field.

6. The improvement of claim 5, further comprising a secondary set of control fields disposed between the sync field and the secondary sync field.

7. The improvement of claim 6, wherein the secondary set of control fields comprises a phase locked oscillator field providing signal timing and amplitude information to the read channel.

8. The improvement of claim 5, further comprising a secondary user data field disposed between the sync field and the secondary sync field, wherein a portion of the encoded user data is stored in the secondary user data field and remaining portions of the encoded user data are stored in the user data field.

9. The improvement of claim 8, wherein the read channel further comprises error detection and correction circuitry capable of correcting up to a selected number of erroneous bytes of user data and wherein the number of bytes of encoded user data that can be stored in the secondary user data field is selected to be within the error detection and correction capability of the error detection and correction circuitry.

10. The improvement of claim 5, wherein the anomalous condition is a thermal asperity and the distance separating the sync field and the secondary sync field is sufficient to prevent the thermal asperity from affecting both the sync field and the secondary sync field.

11. A disc drive, comprising:

a write channel which encodes n bit patterns of input user data into corresponding legal n+k bit patterns of encoded user data;

a rotatable disc having at least one nominally concentric track on which the encoded user data are stored through the selective magnetization of the track;

a head controllably positionable adjacent the track which generates read signals during a read operation in response to the selective magnetization of the track;

a read channel responsive to the head which decodes the encoded user data to recover the original input user data from the read signals; and a contiguous data block on the track, the data block comprising:

a user data field in which the encoded user data are stored;

a first sync field preceding the user data field having a first sync pattern used to synchronize the read channel for subsequent recovery of the original input user data; and a second sync field preceding the user data field and disposed between the first sync field and the user data field having a second sync pattern different from the first sync pattern used to synchronize the read channel for subsequent recovery of the original input user data at such time that the read channel fails to detect the first sync pattern of the first sync field, wherein the first and second sync fields are separated within the data block by a sufficient distance to enable detection of the second sync pattern when an anomalous condition prevents detection of the first sync pattern, and wherein the second sync pattern comprises an illegal n+k bit pattern to facilitate differentiation of the second sync pattern from the legal n+k bit patterns of the encoded user data in the user data field.

12. The disc drive of claim 11, wherein the contiguous data block further comprises:

a control field disposed between the first and second sync fields, the control field providing control information to the read channel.

13. The disc drive of claim 11, wherein the user data field is characterized as a second user data field, and wherein the contiguous data block further comprises:

a first user data field disposed between the first and second sync fields, wherein a portion of the encoded user data is stored in the first user data field, and wherein remaining portions of the encoded user data are stored in the second user data field.

14. The disc drive of claim 11, further comprising:

an interface circuit responsive to the read channel, the interface circuit directing the operation of the read channel and transferring the original input user data recovered by the read channel to a host computer.

15. The disc drive of claim 14, wherein the interface circuit discards the illegal n+k bit pattern from the second sync field at such time that synchronization is achieved from the first sync pattern of the first sync field.

16. The disc drive of claim 14, wherein the read channel further comprises:

a sync word detector for detecting the first and second sync patterns of the first and second sync fields; and a buffer, responsive to the sync word detector, for discarding the illegal n+k bit pattern from the second sync field at such time that synchronization is achieved from the first sync pattern of the first sync field to prevent receipt of the illegal n+k bit pattern by the interface circuit.

17. In a disc drive having a write channel which encodes n bit patterns of input user data into corresponding legal n+k bit patterns of encoded user data, a head positionable with respect to tracks on a disc to write the encoded user data and a read channel responsive to read signals generated by the head as the head transduces the encoded user data, a method for recovering input user data, comprising steps of:

(a) providing a contiguous data block on a selected track having a user data block in which encoded user data are stored and first and second sync fields preceding the user data block separated by a selected distance within the data block, the first and second sync fields having respective first and second sync patterns for synchronizing the read channel for receipt of the read signals corresponding to the user data, wherein the second sync pattern is different from the first sync pattern and comprises an illegal n+k bit pattern sync pattern to differentiate the second sync pattern from the legal n+k bit patterns of the encoded user data in the user data field;

(b) positioning the read head adjacent the data block;

(c) synchronizing the read channel for receipt of the read signals corresponding to the encoded user data using the second sync pattern when the read channel fails to be synchronized by the first sync pattern; and (d) retrieving the original input user data from the read signals corresponding to the encoded user data from the user data field.

18. The method of claim 17, wherein step (a) further comprises steps of:

(a)(1) providing the data block with a control field between the first and second sync fields, the control field having a control pattern used by the read channel to set timing and amplitude parameters in order to enhance the retrieval of the original input user data from the read signals.

19. The method of claim 17, wherein the user data field is characterized as a second user data field, and wherein step (a) further comprises steps of:

(a)(1) providing the data block with a first user data field between the first and second sync fields, wherein a portion of the user data is stored in the first user data field and remaining portions of the user data are stored in the second user data field.

* * * * *

UNITED STATES PATENT AND TRADEMARK OFFICE
CERTIFICATE OF CORRECTION

PATENT NO. : 6,108,152
DATED : August 22, 2000
INVENTOR(S) : Ke Du, Robert D. Cronch, Kenneth R. Burns and Bernardo Rub Page 1 of 1

It is certified that error appears in the above-identified patent and that said Letters Patent is hereby corrected as shown below:

<u>Column 12,</u>
Line 62, replace "...field (which...) 208..." with -- ...field 208 (which.....) --.

<u>Column 13,</u>
Line 27, replace "...in a ECC..." with -- ...in an ECC... --.

<u>Column 20,</u>
Line 41, replace "bytes. The...." with -- bytes.
The... --.

<u>Column 27,</u>
Line 18, replace "in the
second user data field." with -- in the second user data field. --

Signed and Sealed this

Twenty-third Day of April, 2002

JAMES E. ROGAN
*Director of the United States Patent and Trademark Office*

*Attest:*

*Attesting Officer*